(12) United States Patent
Gomez et al.

(10) Patent No.: US 10,798,938 B2
(45) Date of Patent: Oct. 13, 2020

(54) NANOCERIA AUGMENTATION OF PLANT PHOTOSYNTHESIS UNDER ABIOTIC STRESS

(71) Applicant: The Regents of the University of California, Oakland, CA (US)

(72) Inventors: Juan Pablo Giraldo Gomez, Claremont, CA (US); Honghong Wu, Riverside, CA (US); Nicholas Tito, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 355 days.

(21) Appl. No.: 15/630,542

(22) Filed: Jun. 22, 2017

(65) Prior Publication Data

US 2017/0367325 A1 Dec. 28, 2017

Related U.S. Application Data

(60) Provisional application No. 62/353,747, filed on Jun. 23, 2016.

(51) Int. Cl.
*A01N 25/26* (2006.01)
*C09D 133/02* (2006.01)
*A01N 59/16* (2006.01)

(52) U.S. Cl.
CPC ............. *A01N 25/26* (2013.01); *A01N 59/16* (2013.01); *C09D 133/02* (2013.01)

(58) Field of Classification Search
CPC ........ A01N 25/26; A01N 59/16; C09D 133/02
See application file for complete search history.

(56) References Cited

U.S. PATENT DOCUMENTS

| 8,333,993 B1 * | 12/2012 | Perez | ...................... A61K 33/00 424/489 |
| 2015/0047074 A1 * | 2/2015 | Strano | ...................... A01H 5/00 800/298 |

FOREIGN PATENT DOCUMENTS

WO 2015-021266 A1 2/2015

OTHER PUBLICATIONS

Carbon Nanotubes and Inorganic Nanoparticles Enhance Photosynthetic Activity and Stability, [online]. US Department of Energy, Phys.org, 2015 [retrieved on Jan. 19, 2018]. Retrieved from the Internet:<URL: https://phys.org/news/2015-05-carbon-nanotubes-inorganic-nanoparticles-photosynthetic.html> , 2 pages.*
Giraldo et al., "Plant Nanobionics Approach to Augment Photosynthesis and Biochemical Sensing," Nature Materials, 13, (2014) 400-408.

* cited by examiner

*Primary Examiner* — John Pak
*Assistant Examiner* — Andriae M Holt
(74) *Attorney, Agent, or Firm* — Kilpatrick Townsend & Stockton LLP

(57) ABSTRACT

A nanobionic approach for augmenting plant photoprotection and photosynthetic light energy conversion and carbon assimilation under abiotic (e.g., light) stress was used. Cerium oxide nanoparticles (nanoceria) improve *Arabidopsis* maximum quantum yield of photosystem II (10%) and carbon assimilation (19%) by protecting leaf mesophyll chloroplasts from damaging reactive oxygen species (ROS). Nanoceria augments scavenging of superoxide and hydroxyl radicals. For the latter, there are not known scavenging enzymatic pathways.

5 Claims, 22 Drawing Sheets
(20 of 22 Drawing Sheet(s) Filed in Color)

FIG. 13A
FIG. 13B
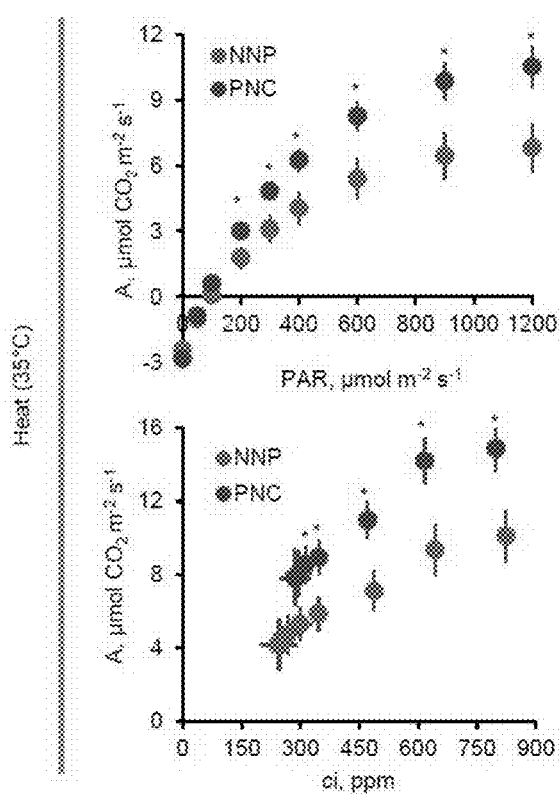
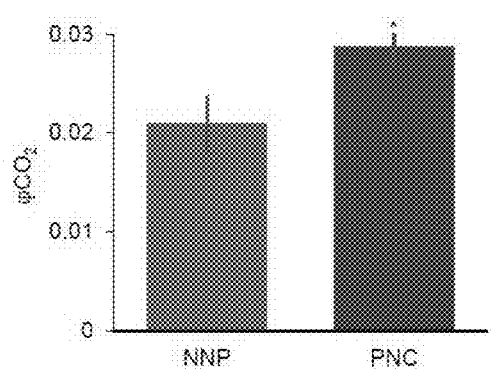
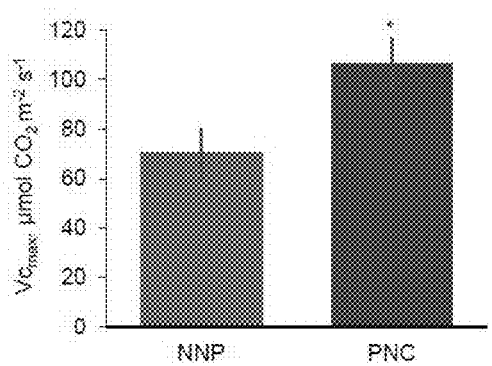
FIG. 13C
FIG. 13D

FIG. 13E 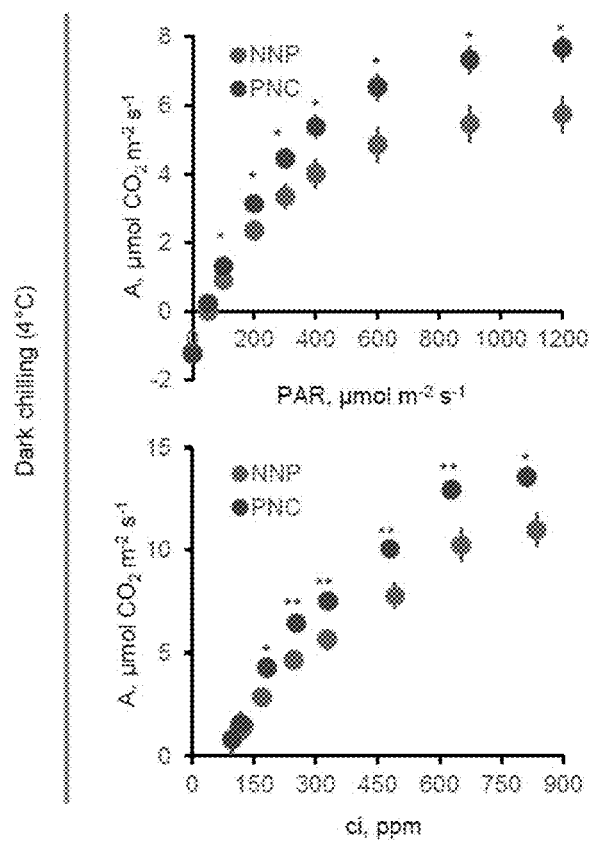 FIG. 13F 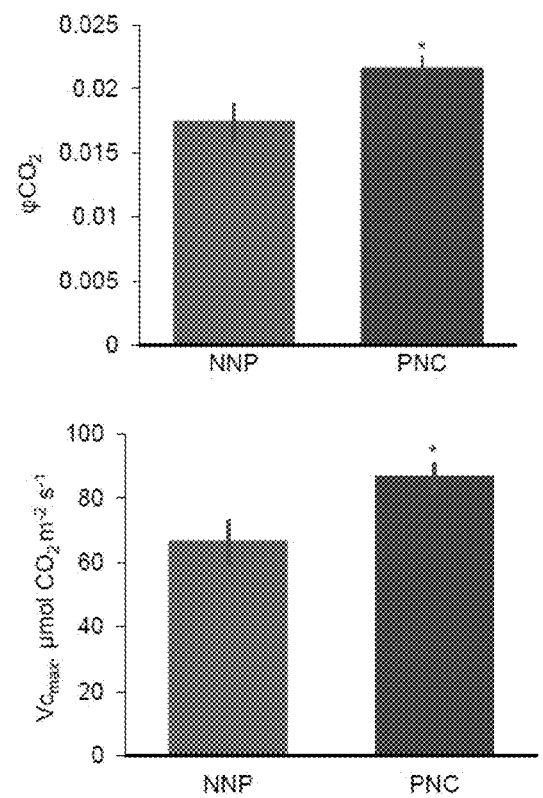
FIG. 13G
FIG. 13H

Salinity Stress

NANOCERIA AUGMENTATION OF PLANT PHOTOSYNTHESIS UNDER ABIOTIC STRESS

CROSS-REFERENCE TO RELATED PATENT APPLICATIONS

The present patent application claims benefit of priority to U.S. Provisional Patent Application No. 62/353,747, filed Jun. 23, 2016, which is incorporated by reference for all purposes.

BACKGROUND OF THE INVENTION

Plant nanobionics is a novel approach that seeks to enable plant organelles, tissues, and whole organisms with novel and augmented functions through the use of nanomaterials (Giraldo, J. P. et al. *Nat. Mater.* 13, 400-408 (2014)). This nascent field at the interface of nanotechnology and plant biology has the potential to create plants with augmented protection from light stress and enhanced photosynthesis. Nanoparticles have unique optical, electronic, and catalytic properties, but their impact on plant photosynthesis is poorly understood. Recently, a plant nanobionic approach demonstrated enhanced electron transport rates in extracted spinach chloroplasts and *Arabidopsis* leaves as a result of the spontaneous penetration of single walled carbon nanotubes within the thylakoid membranes (Giraldo, J. P. et al. *Nat. Mater.* 13, 400-408 (2014)). Cerium oxide nanoparticles (nanoceria) were also shown to act as potent scavengers of reactive oxygen species (ROS) at the sites of ROS generation in extracted spinach chloroplasts (Giraldo, J. P. et al. Plant nanobionics approach to augment photosynthesis and biochemical sensing. *Nat. Mater.* 13, 400-408 (2014). In chloroplasts, ROS are a main source of structural damage affecting photosynthetic proteins, lipids, and DNA (Arora, A., et al., *Curr. Sci* 82, 1227-1238 (2002)). Nanoceria coated with poly (acrylic acid), a biocompatible polymer, have been shown to penetrate the outer envelopes of extracted chloroplasts (Giraldo, J. P. et al. *Nat. Mater.* 13, 400-408 (2014)). By localizing poly (acrylic acid) nanoceria (PNC) inside extracted chloroplasts at the sites of ROS generation, levels of ROS and superoxide drop by 29% and 59%, respectively (Giraldo, J. P. et al. *Nat. Mater.* 13, 400-408 (2014)). However, it was not known whether nanoceria reach the sites of ROS production in the chloroplast thylakoid membranes in vivo, and their impact on the light and carbon reactions of plant photosynthesis.

BRIEF SUMMARY OF THE INVENTION

In some embodiments, methods of reducing reactive oxygen species (and optionally enhancing carbon fixation) in a plant are provided. In some embodiments, the methods comprise contacting the plant with a cerium oxide nanoparticles coated with a polymer coating wherein said polymer coating provides a negative surface charge, wherein the contacting is under conditions such that the cerium oxide nanoparticles become co-localized with chloroplasts, mitochondria, peroxisomes, or a combination thereof in the plant and reduces reactive oxygen species associated with the chloroplasts, thereby reducing reactive oxygen species in the plant.

In some embodiments, the polymer coating comprises negatively-charged acrylic acid.

In some embodiments, the plant is under continuous light for at least a day (e.g., 1, 2, 3, 4, 5, 6, 7, or more) before and a day (e.g., 1, 2, 3, 4, 5, 6, 7, or more) after the contacting. In some embodiments, carbon fixation from photosynthesis is increased compared to a plant not contacted with cerium oxide nanoparticles.

In some embodiments, the plant is under abiotic stress. In some embodiments, the abiotic stress comprises at least one of continuous light or excessive light, drought, low oxygen (e.g., root submergence due to flooding), high salinity (e.g., 100 mM NaCl or above for glycophytes), or the presence of heavy metals (e.g., at high concentrations such as e.g., higher than 0.2 mM $CdCl_2$).

In some embodiments, the plant is grown hydroponically.

In some embodiments including any of those listed above, the contacting comprises spraying aerial portions of the plant, infiltrating the plants, or drenching the roots of the plant with the cerium oxide nanoparticles.

In some embodiments, formulations for agricultural application are provided, wherein the formulation comprises a cerium oxide nanoparticles coated with a polymer coating wherein said polymer coating provides a negative surface charge. In some embodiments, the polymer coating comprises negatively-charged acrylic acid. In some embodiments, the formulation further comprises a surfactant, fungicide, herbicide, pesticide, or plant fertilizer.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1B, Chloroplast and nanoceria fluorescence intensity across a region of interest (ROI) in confocal image overlay. FIG. 1C, Temporal pattern of PNC uptake by leaf mesophyll chloroplasts after leaf infiltration. Mean±S.E. (n=3-5). Scale bar 50 μm.

FIG. 2A, Schematic diagram showing steps of nanoceria transport from leaf air intercellular spaces to mesophyll chloroplasts. Nanoceria are delivered into the leaf by infiltration through the stomata (Step 1). The nanoparticles are transported through leaf mesophyll cell walls (Step 2). Nanoceria binds to the outer side of the leaf mesophyll cell membrane where electrostatic interactions with the positively charged side of the membrane favor the binding of negatively charged PNC (Step 3). Nanoceria transport into cell cytosol and chloroplasts is not endocytosis dependent but it is affected by the plasma membrane potential (MP) (Step 4). FIG. 2B, Cell membrane depolarization with 100 mM NaCl influences the colocalization of both PNC and ANC with leaf mesophyll chloroplasts. Chloroplast colocalization with PNC increases whereas with ANC decreases. An osmotic control with mannitol (170 mM) did not impact significantly the colocalization of chloroplasts with PNC and ANC. FIG. 2C, colocalization percentage of chloroplast with PNC and ANC. FIG. 2D, Similar colocalization percentage of chloroplast with PNC and ANC were observed in leaves infiltrated at 24° C., 14° C., and 4° C. Different lower case letters represent the significance at 0.05 level. One-way ANOVA based on Duncan's multiple range test was used. Mean±S.E. (n=3-8). Scale bar 50 μm.

Figure 3A:
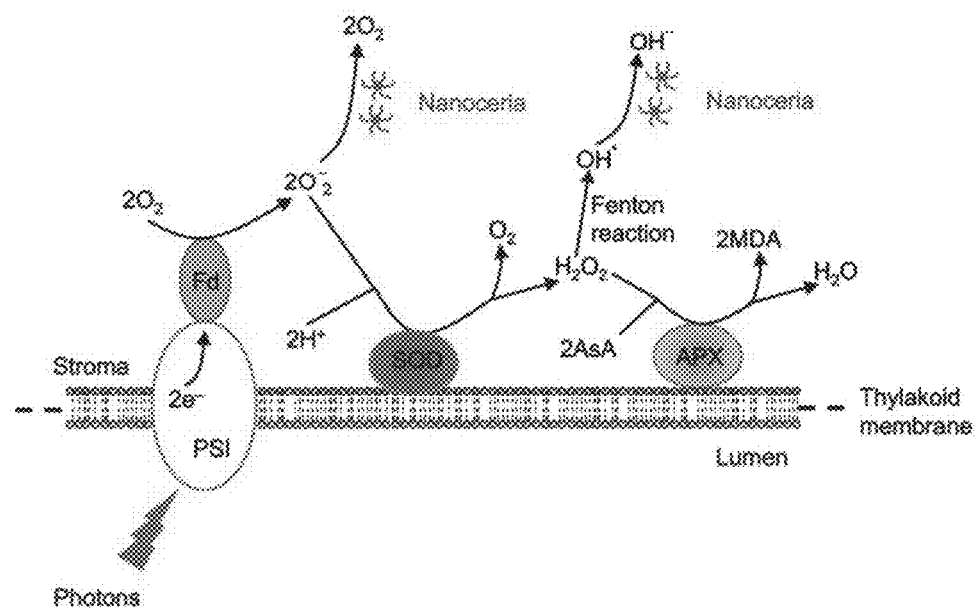
Figure 3B:
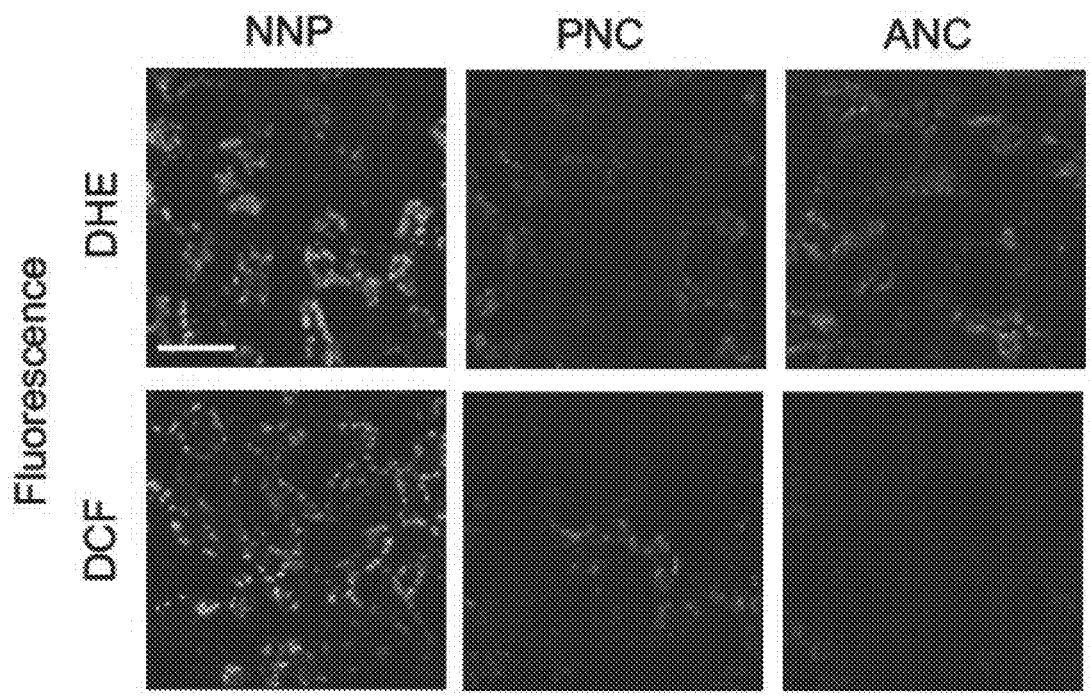
Figure 3C:
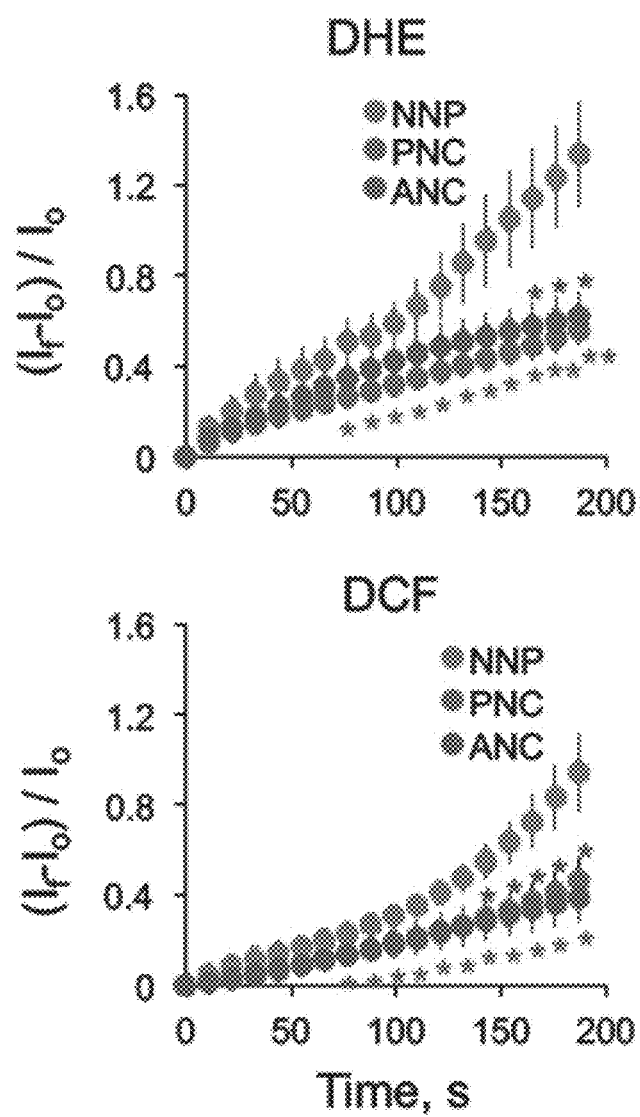

FIGS. 3A-3B. In vivo ROS scavenging by PNC and ANC in leaf mesophyll cells. FIG. 3A, Schematic showing the mechanisms of PNC and ANC scavenging of ROS by nanoceria. Briefly, excess light leads to electron transfer from PSI to oxygen forming superoxide anions ($O^-_2$). Superoxide anion is catalyzed to hydrogen peroxide ($H_2O_2$) via superoxide dismutase (SOD). Hydrogen peroxide is either transformed to $H_2O$ through the reaction with ascorbate (AsA) and ascorbate peroxidase (APX) or to hydroxyl radical ($OH^·$) via Fenton reaction. Hydroxyl radical is the most destructive ROS in plants and there is no known enzyme able to scavenge it. In the presence of nanoceria, superoxide anions and hydroxyl radicals are catalyzed to oxygen and hydroxyl ions, respectively. FIG. 3B, ROS and superoxide generation were monitored by confocal imaging of DCF and DHE fluorescence, respectively, in leaf mesophyll cells exposed to 3 min of UV-A light (405 nm). Leaves were infiltrated with PNC, ANC and TES buffer as control (no nanoparticles, NNP). FIG. 3C, Time series of DHE and DCF fluorescence intensity calculated as the change between final ($I_f$) and initial (Io) fluorescence intensity normalized by Io. Statistics were performed by independent-samples t-test (SPSS 23, *P<0.05, **P<0.01). Different colors of asterisks in figures correspond to statistical comparisons between color labeled treatments and buffer controls. Mean±S.E. (n=3-5). Scale bar 50 μm.

Figures 4A, 4B:
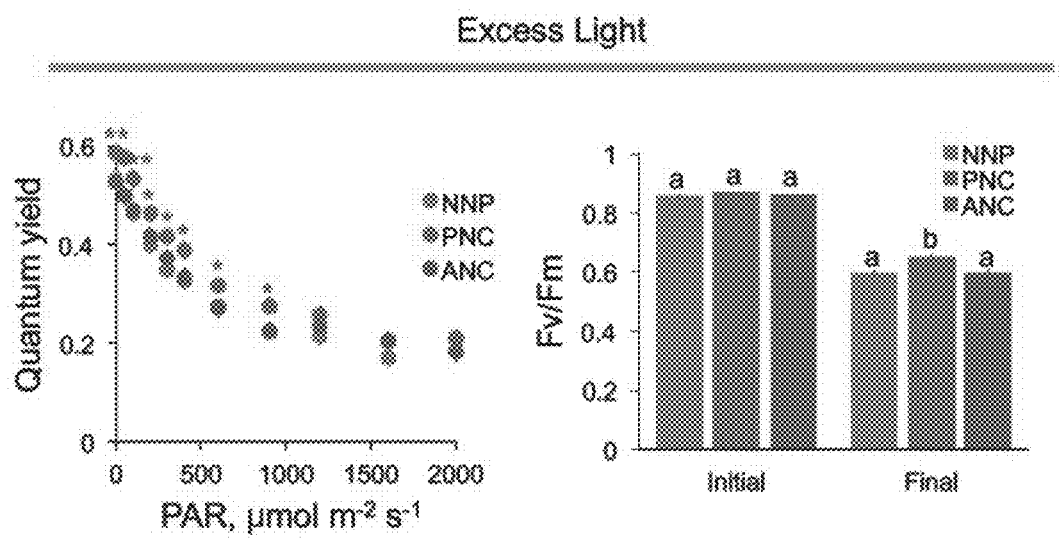
Figures 4C, 4D:
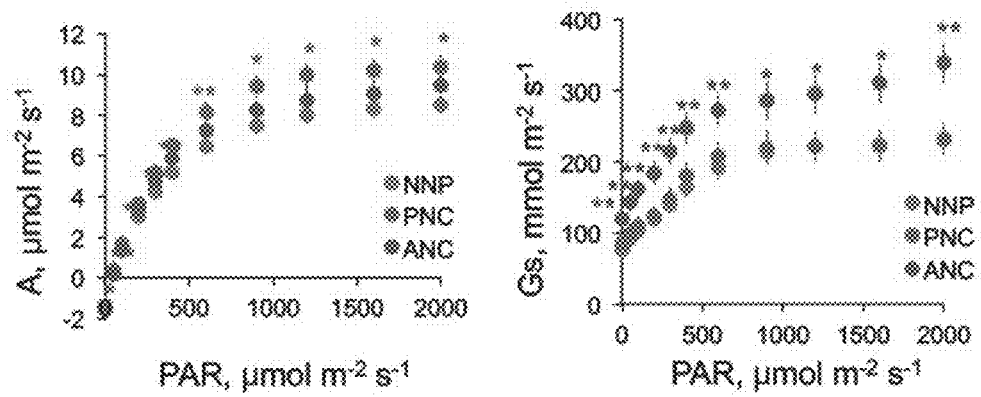
Figure 4G:
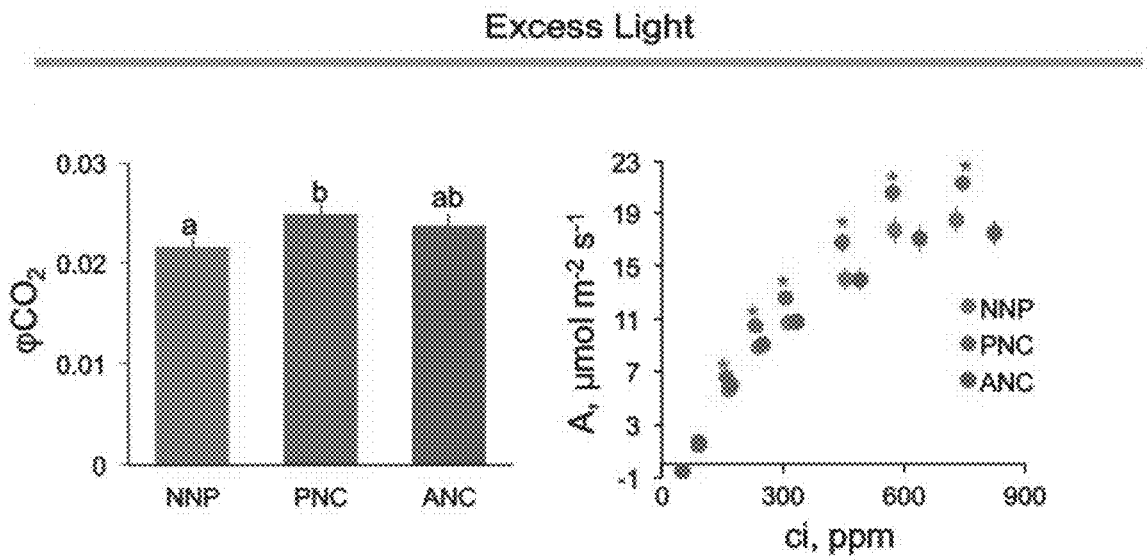
Figure 4G:
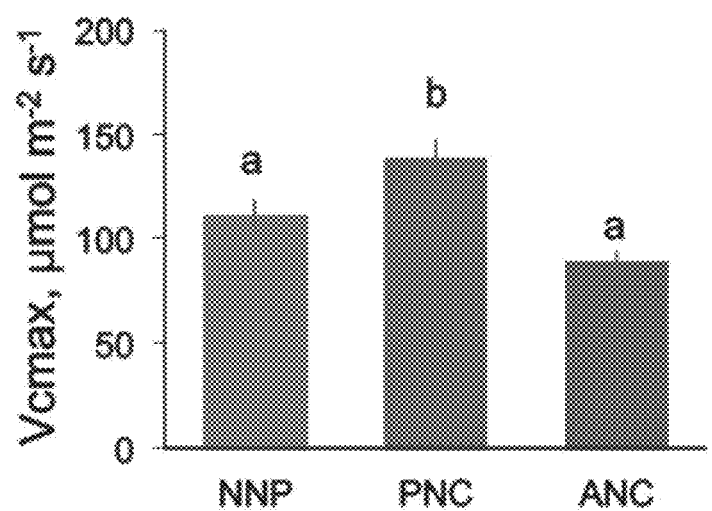

FIGS. 4A-4G Nanobionic photoprotection of *Arabidopsis* plants under excess photosynthetic active radiation (PAR). Response of photosynthetic parameters to excess PAR in leaves infiltrated with PNC, ANC, and TES buffer as control (no nanoparticles, NNP). FIG. 4A, PNC but not ANC enhances leaf quantum yields below 900 μmol m$^{-2}$ s$^{-1}$ PAR. FIG. 4, PNC maintains higher maximum yields of PSII ($F_v/F_m$) after exposure to excess PAR. FIG. 4C, Assimilation (A) light curves show that PNC-Leaves have higher maximum assimilation rates. However, FIG. 4D, ANC but not PNC infiltrated leaves have higher stomatal conductance (Gs). FIG. 4E, Quantum efficiency of $CO_2$ uptake ($\varphi CO_2$) is 15% higher in PNC-Leaves than Buffer-Leaves. FIG. 4F, Assimilation versus internal carbon concentration (ci) curve indicate photoprotection of the carbon reactions of photosynthesis by PNC but not ANC. FIG. 4G, PNC promotes higher maximum carboxylation rates ($Vc_{max}$). Statistical comparisons in FIGS. 4A-4D and 4F were performed by Independent-Samples t-test by SPSS 23 (*P<0.05, **P<0.01). Different colors of asterisks in figures correspond to the statistical comparison between color labeled treatments and buffer controls. One-way ANOVA based on Duncan's multiple range test was used in FIGS. 4B, 4E and 4G. Lower case letters represent significance at 0.05 level. Mean±S.E. (n=8-15).

Figures 5A, 5B:
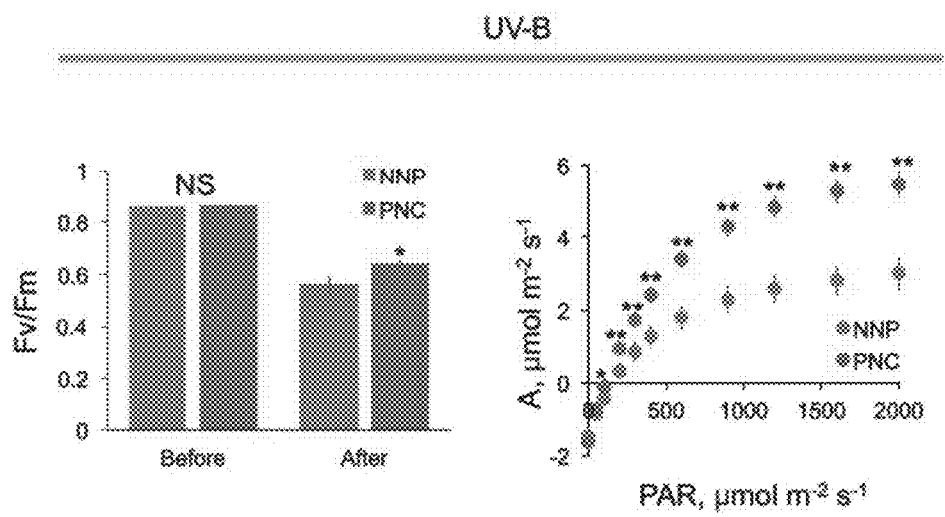
Figures 5C, 5D:
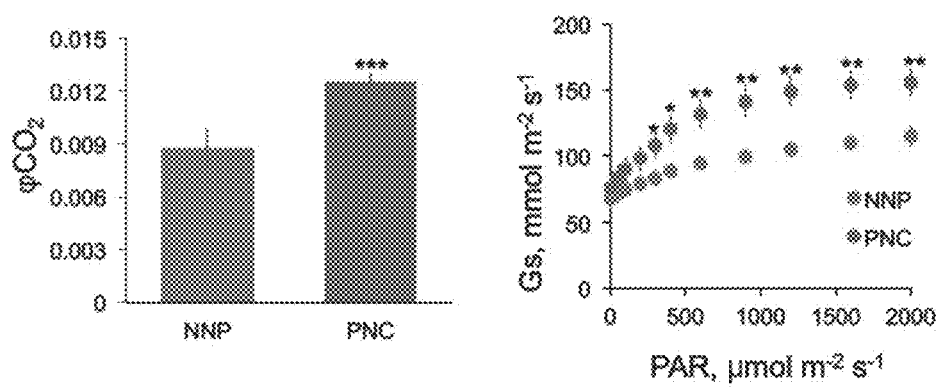

FIGS. 5A-5D Nanoceria plant photoprotection from exposure to UV-B light. Impact of UV-B light stress on the health of photosystem II (PSII) and leaf gas exchange of *Arabidopsis* plants. FIG. 5A, After exposure to UV-B light, maximum quantum yields of PSII (Fv/Fm) are significantly higher in PNC infiltrated leaves than TES buffer infiltrated leaves (no nanoparticles, NNP). FIG. 5B, PNC enhances leaf carbon assimilation rates (A) across a wide PAR range from 100 to 2000 μmol m$^{-2}$ s$^{-1}$. FIG. 5C, PNC enables higher quantum yield of $CO_2$ uptake ($\varphi CO_2$). FIG. 5D, PNC also increases leaf stomatal conductance (Gs) from 300 to 2000 μmol m$^{-2}$ s$^{-1}$ PAR. The comparison of photosynthetic parameters between plants infiltrated with PNC and TES buffer was performed by independent-samples t-test (SPSS 23, *P<0.05, **P<0.01). Mean±S.E. (n=8-10).

Figure 6A:
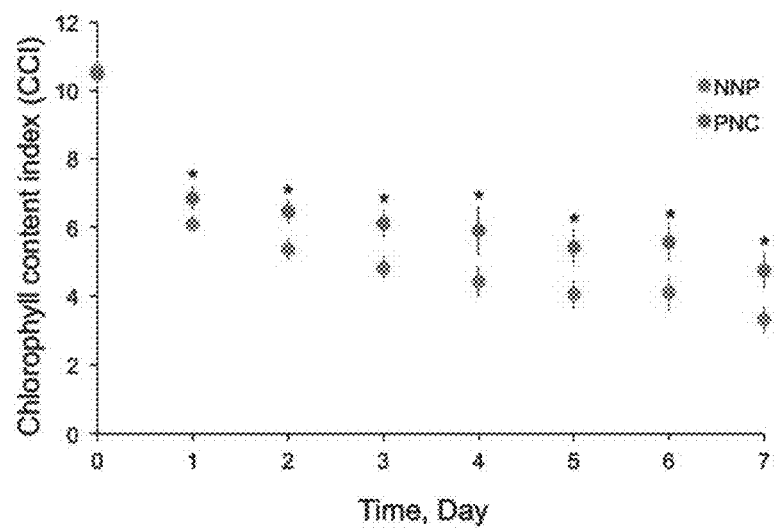
Figure 6B:
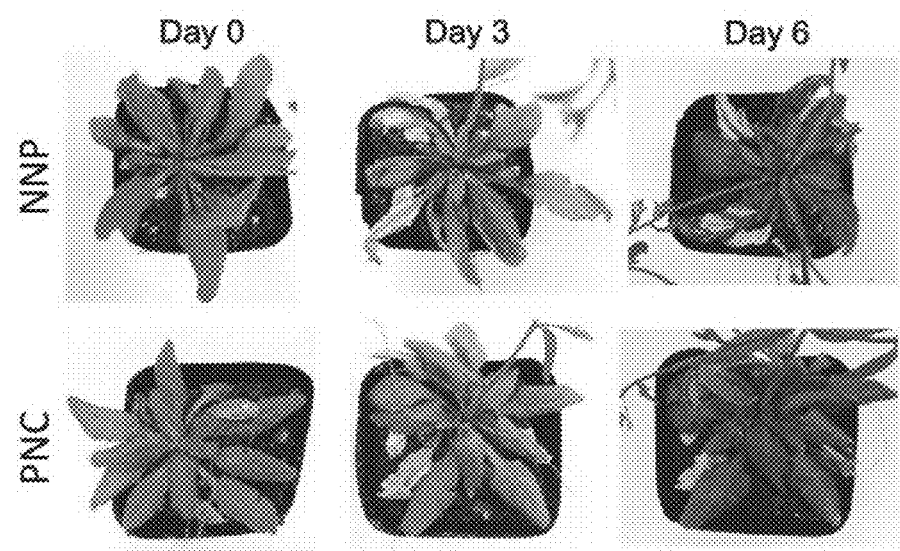

FIGS. 6A-6B *Arabidopsis* enhanced tolerance to excess continuous light enabled by nanoceria. FIG. 6A, Exposure of *Arabidopsis* plants to 1300 μmol m$^{-2}$ s$^{-1}$ of continuous light led to a decline in leaf chlorophyll content index (CCI). However, plants infiltrated with PNC maintained a significantly higher CCI than those treated with TES buffer as control (no nanoparticles, NNP). FIG. 6B, Substantial damage to the leaf lamina of *Arabidopsis* plants exposed to excess continuous light was mitigated by PNC. Statistical comparisons were performed by independent-samples t-test (SPSS 23, *P<0.05, **P<0.01). Mean±S.E. (n=15).

Figure 7C:
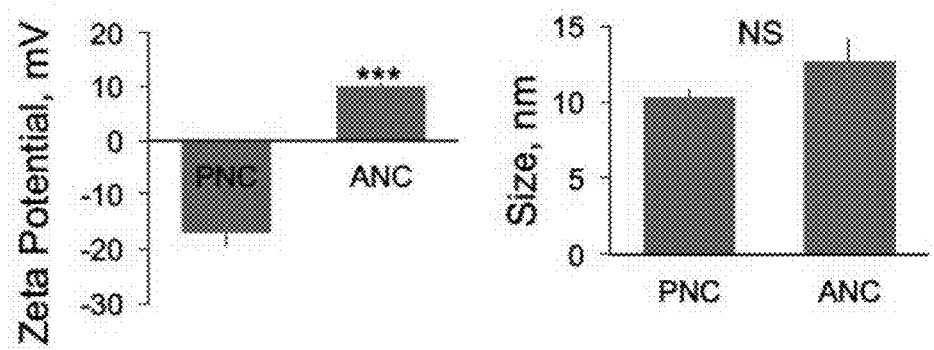
Figure 7C:
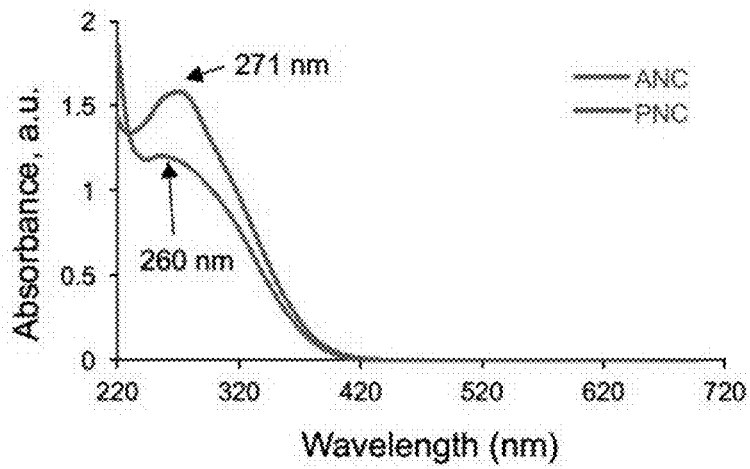
Figure 7D:
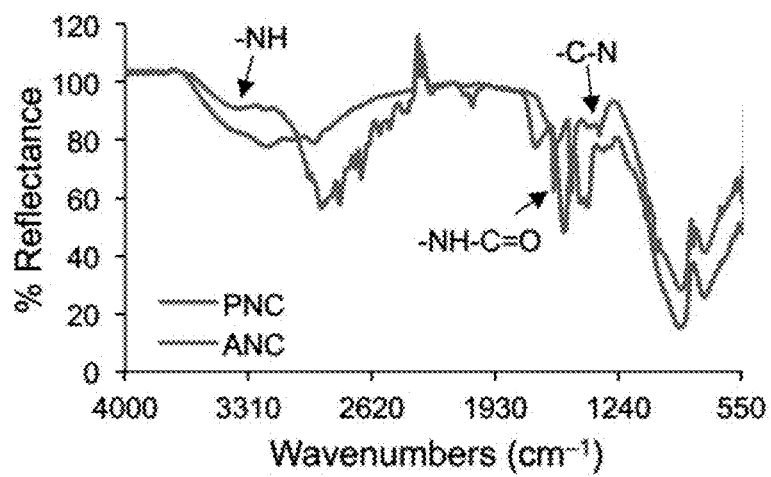

FIGS. 7A-7D Nanoceria characterization. Comparison of (FIG. 7A) zeta potential and (FIG. 7A) size between negatively charged poly (acrylic acid) nanoceria (PNC) and positively charged aminated poly (acrylic acid) nanoceria (ANC). FIG. 7C, Absorbance of PNC and ANC measured by UVVIS spectrophotometry. FIG. 7D, FTIR analysis of PNC and ANC. Statistics was performed by independent-samples t-test (SPSS 23, *P<0.05, **P<0.01). Mean±S.E. (n=3-5).

Figure 8:
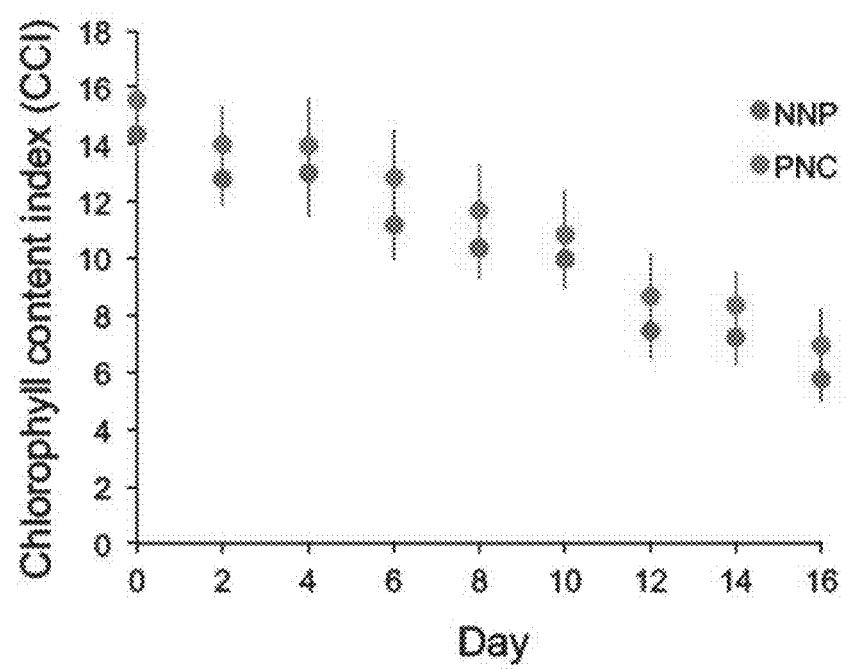
Figure 9A:
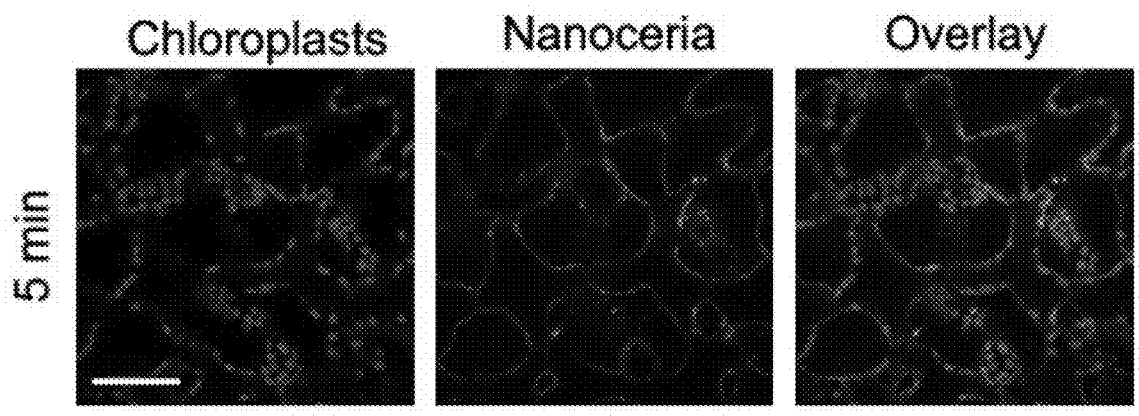
Figure 9B:
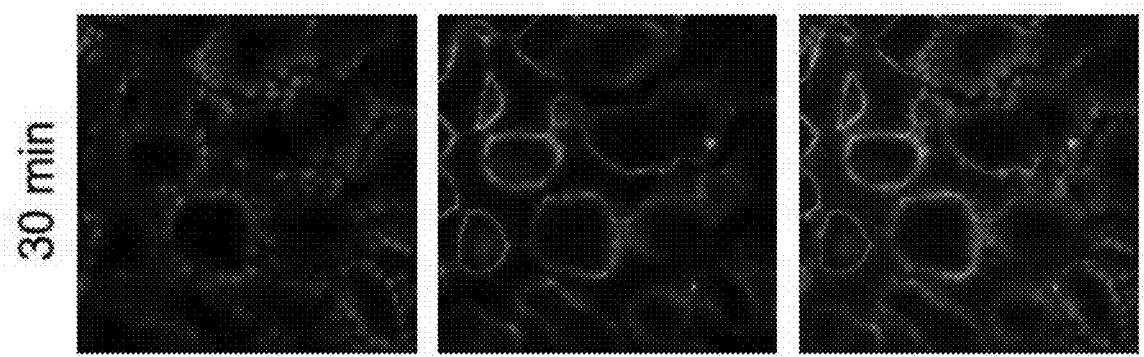
Figure 9C:
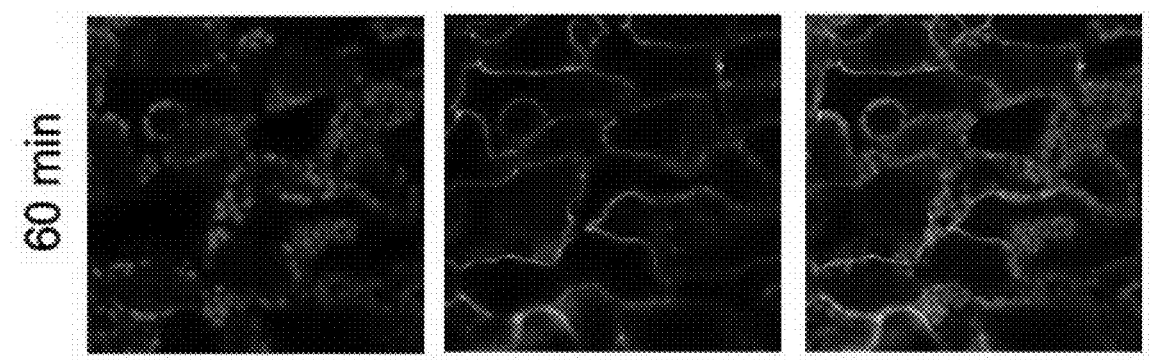
Figure 9D:
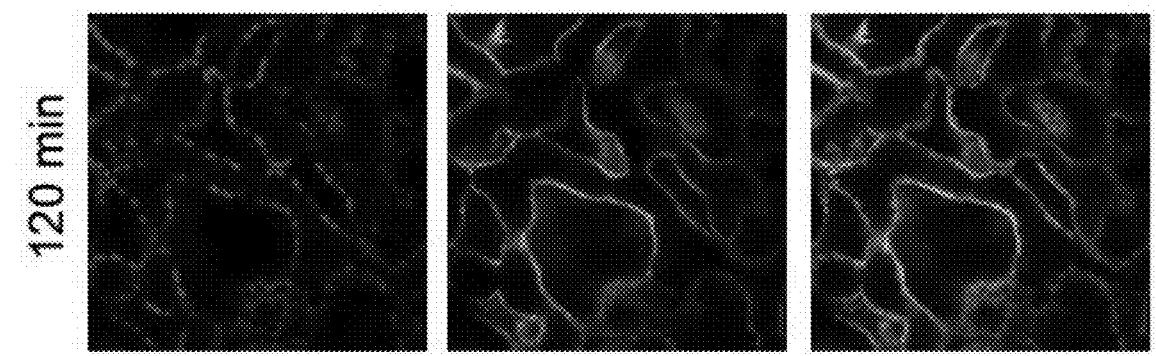

FIG. 8 Temporal patterns of leaf chlorophyll content index (CCI) in *Arabidopsis* plants infiltrated with PNC. PNC at 450 μM did not affect leaf chlorophyll content index of *Arabidopsis* plants in growth chamber conditions under 200 μmol m-2 s-1 PAR, 14/10 hr light and dark period. Statistical comparisons were performed by independent-samples test (SPSS 23). Mean±S.E. (n=10).

FIGS. 9A-9D Temporal change in nanoceria colocalization with chloroplasts. Confocal images show colocalization of chloroplast chlorophyll fluorescence (red) in leaf mesophyll cells with PNC (green) after 5 (FIG. 9A), 30 (FIG. 9B), 60 (FIG. 9C), and 120 min (FIG. 9D) of leaf infiltration with PNC. Scale bar 50 μm.

Figures 10A, 10B:
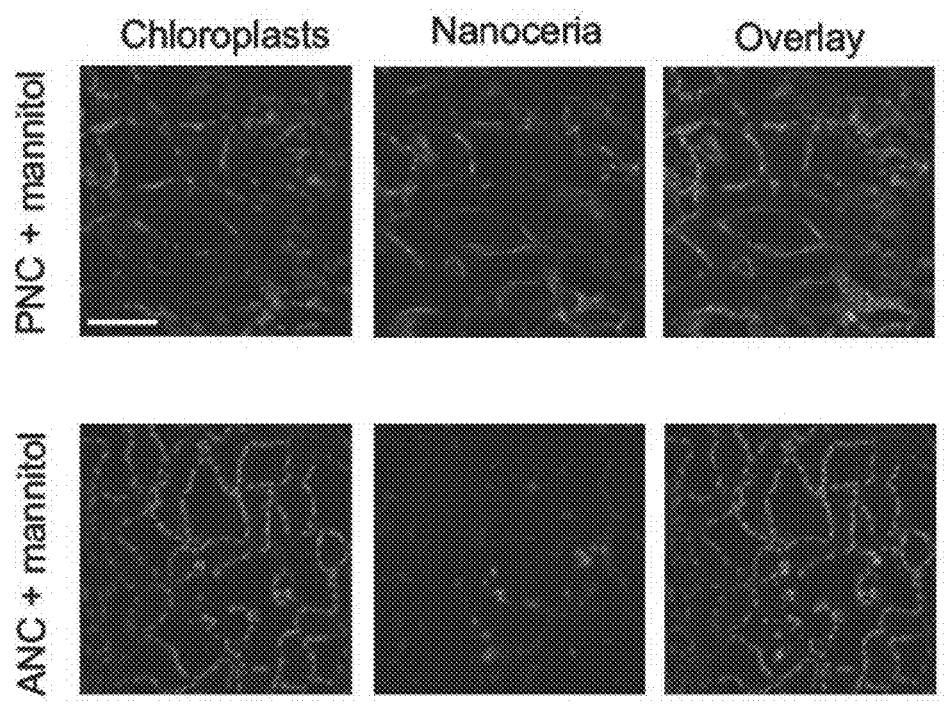

FIGS. 10A-10B Osmotic stress does not affect PNC and ANC colocalization with chloroplasts. Confocal images of chloroplast chlorophyll fluorescence (red) and PNC (FIG. 10A) and ANC (FIG. 10B) in leaf mesophyll cells. Colocalization of chloroplasts with nanoceria was not significantly affected by infiltration with 170 mM mannitol (isotonic to 100 mM NaCl). Scale bar 50 μm.

Figure 11A:
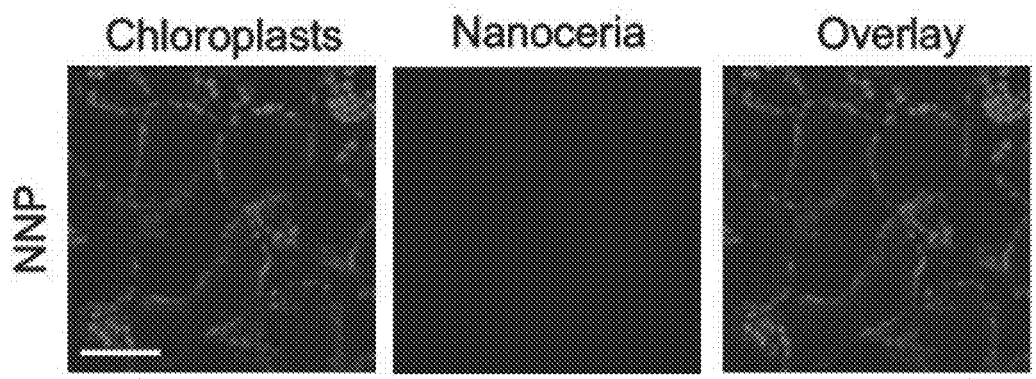
Figure 11B:
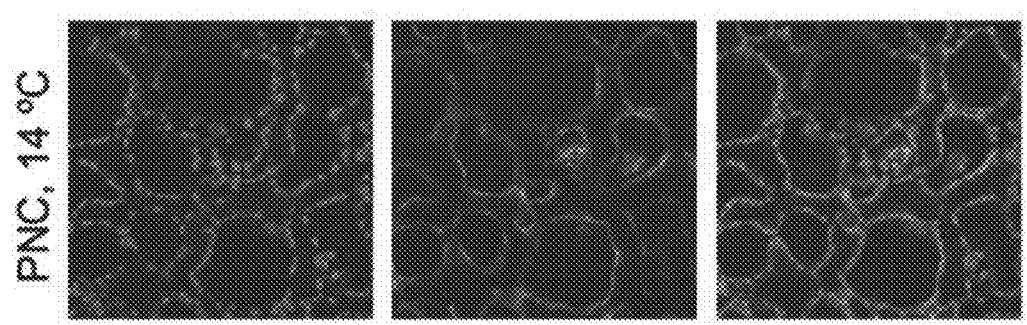
Figure 11C:
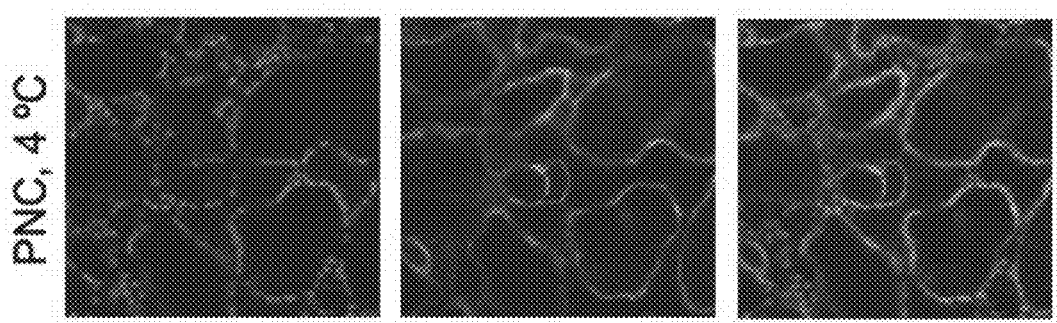
Figure 11D:
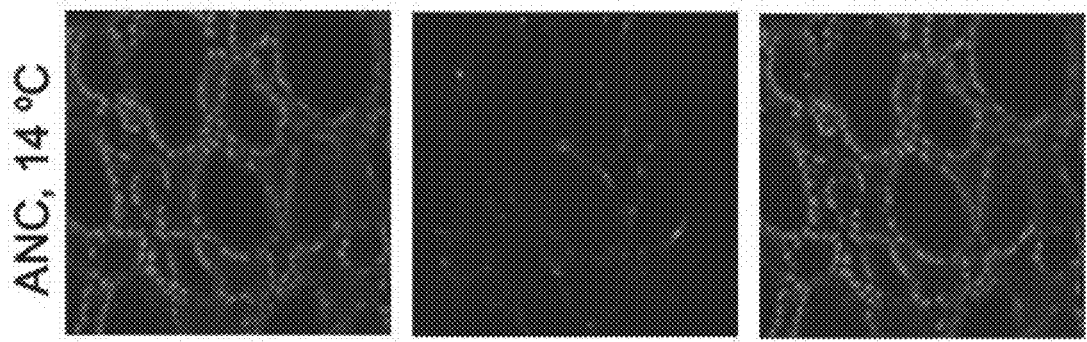

FIGS. 11A-11E Temperature does not influence nanoceria colocalization with chloroplast. FIG. 11A, Confocal images of leaf mesophyll cells of plants infiltrated with TES buffer as control. FIGS. 11B AND 11C, Similar colocalization of chloroplast with PNC after incubation at 14° C. and 4° C. FIGS. 11D AND 11E, Likewise, no change in colocalization of chloroplast with ANC after incubation at 14° C. and 4° C. Scale bar 50 μm.

Figure 12A:
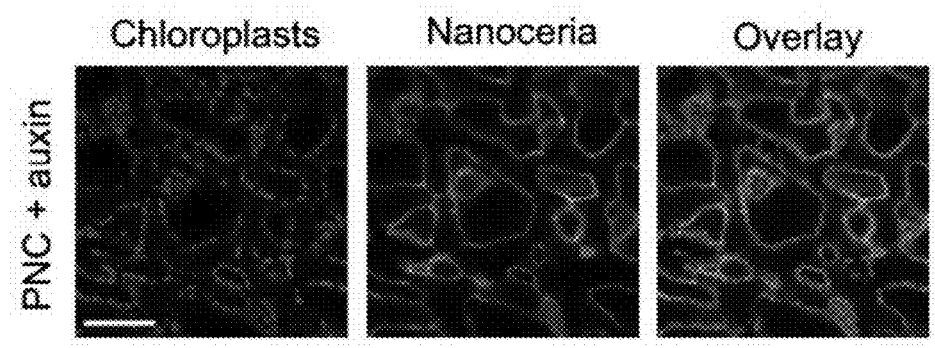
Figure 12B:
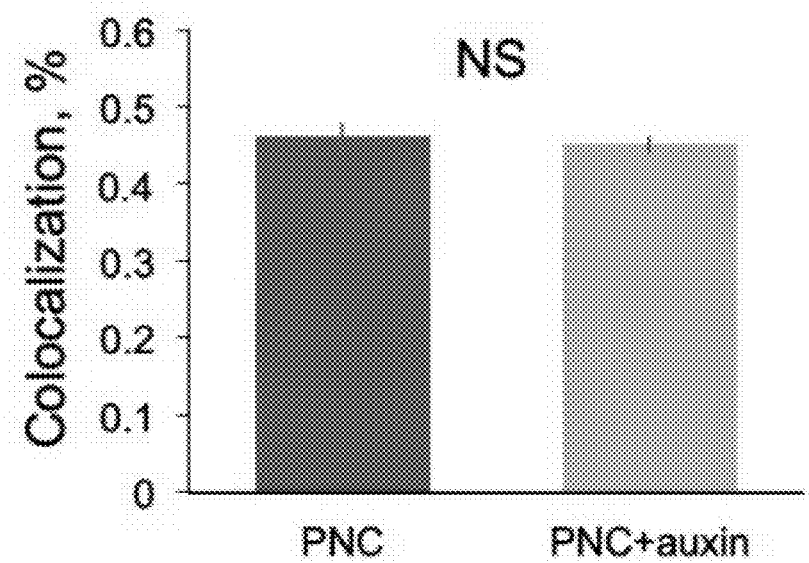

FIGS. 12A-12B Chloroplast colocalization with PNC is not affected by auxin. A Confocal images of leaf mesophyll cells showing colocalization of chloroplast chlorophyll fluorescence with PNC after infiltration with auxin, an endocytosis inhibitor. FIG. 12B, No significant change in chloroplast colocalization with PNC in the presence of auxin. Statistical comparison was performed by independent-samples t-test (NS, no significant difference). Mean±S.E. (n=3-5). Scale bar 50 μm.

FIGS. 13A-13H Nanoceria protection of photosynthesis carboxylation reactions of *Arabidopsis* plants from heat and dark chilling. (FIGS. 13A, 13B) PNC infiltrated leaves exposed to heat (35 C) have significantly higher carbon assimilation rates (A) (67% P<0.05) and quantum yield of CO2 uptake ($\varphi$CO2) (27%, P<0.05) relative to controls without nanoparticles (NNP). (FIGS. 13C, 13D) PNC also enables increased A per internal CO2 concentration (Ci) (61%, P<0.01) and higher maximum carboxylation rates (Vcmax) (51%, P<0.05) under heat stress. (FIGS. 13E, 13F). Similarly, dark chilling stressed leaves infiltrated with PNC have enhanced A at a broad range of PAR levels (46%, P<0.05) and higher $\varphi CO2$ (24%, P<0.05) than controls. (FIGS. 13G, 13H) A-Ci curves of dark chilled plants show enhanced A per given Ci (49%, P<0.05) and an increase of Vcmax up to 30% (P<0.05) relative to leaves without nanoparticles. Statistical comparisons were performed by independent-samples t-test (SPSS 23, *P<0.05, **P<0.01). Mean±SE (n=10-12).

Figure 14A:
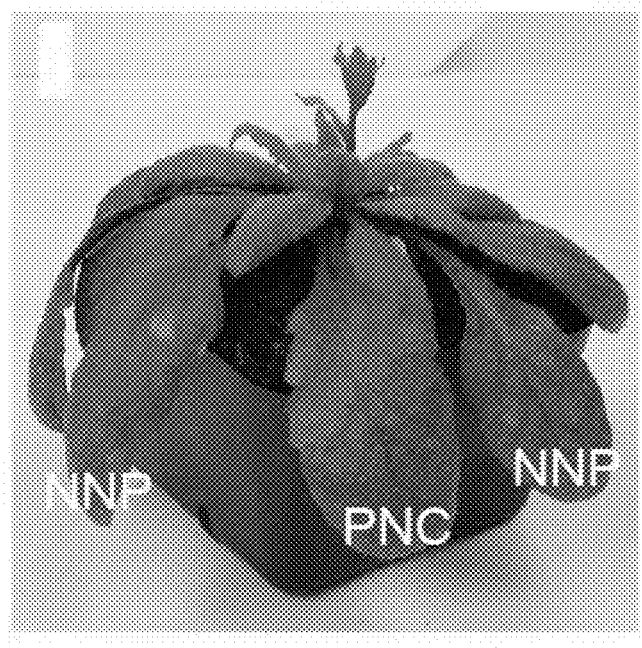
Figure 14B:
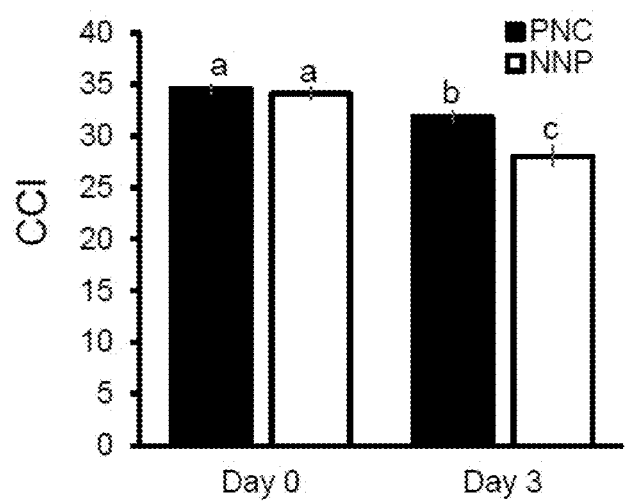
Figure 14C:
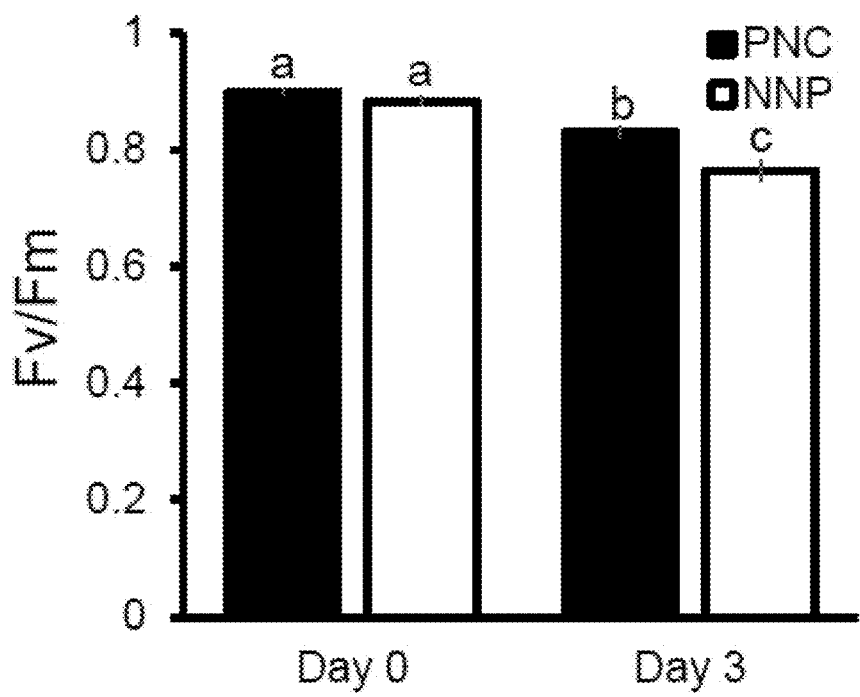
Figure 14D:
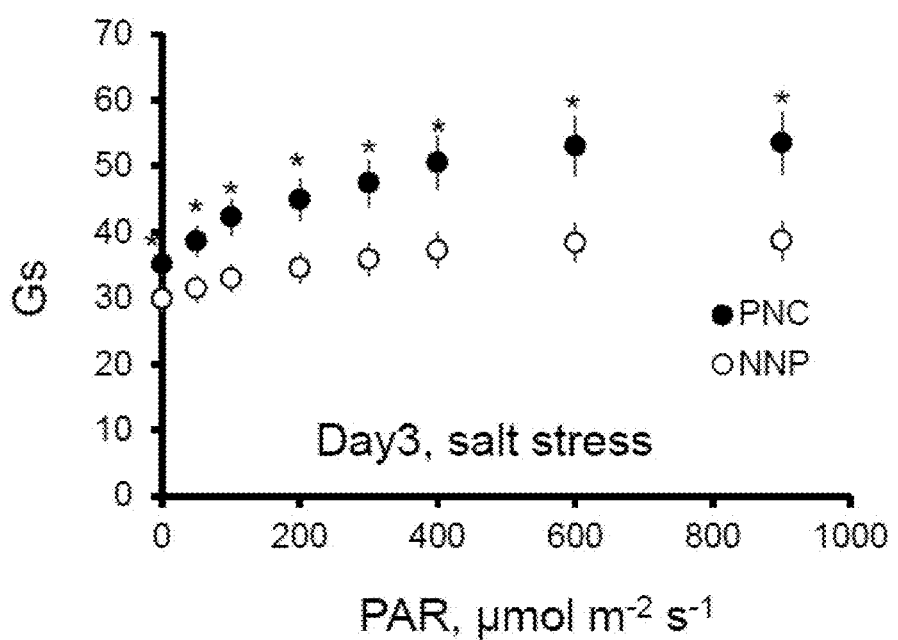
Figure 14E:
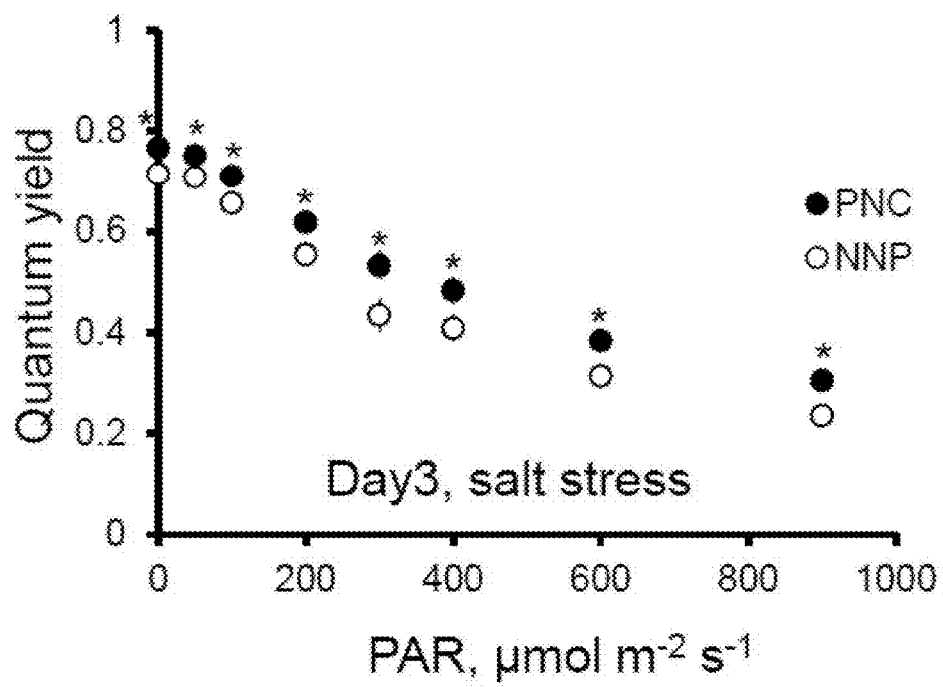
Figure 14F:
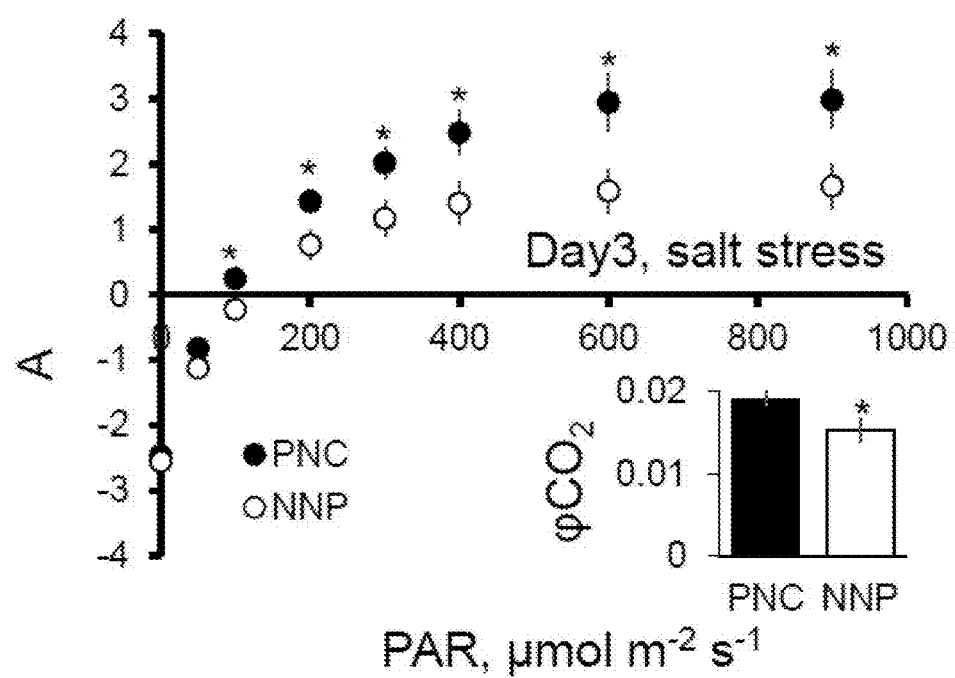

FIGS. 14A-14F Nanoceria protect *Arabidopsis* plants from salinity stress (100 mM NaCl, 3 days). FIG. 14A, Representative image shows leaves infiltrated with poly (acrylic acid) nanoceria (PNC-Leaves) versus leaves without nanoparticles (NNP-Leaves) after being exposed to 100 mM NaCl for 3 days. FIGS. 14B AND 14C, Comparison of chlorophyll content and maximum efficiency of PSII in PNC-Leaves and NNP-Leaves at day 0 and 3 in the presence of 100 mM NaCl. FIGS. 14D, 14E, and 14F, Stomatal conductance (Gs), quantum yield, maximum PSII efficiency (Fv/Fm), and carbon assimilation rates (A) of PNC-Leaves and NNP-Leaves after 3 days, 100 mM NaCl treatment. Mean±SE (n=15-16).

DETAILED DESCRIPTION OF THE INVENTION

The inventors have discovered that certain cerium oxide nanoparticles (nanoceria) can be delivered to whole plants and localize in chloroplasts to effectively remove reactive oxygen species and improve carbon fixation from photosynthesis, even under stress conditions such as excess light and continuous light. In view of this discovery, methods of reducing reactive oxygen species in plants, and optionally improving carbon fixation, are provided that comprise contacting a plant with cerium oxide nanoparticles.

As explained in the examples, it was also discovered that cerium oxide nanoparticles coated with negatively-charged polymers co-localized to chloroplasts in *Arabidopsis* when contacted to whole plants, whereas cerium oxide nanoparticles coated with positively-charged polymers did not. In some embodiments, the cerium oxide nanoparticles are localized to the chloroplasts, mitochondria, peroxisomes, or a combination thereof in a plant following contact of a plant with the nanoparticles and reduces reactive oxygen species associated with these ROS producing organelles.

In some embodiments, the negatively-charged polymers are negatively-charged acrylic acid polymers. Preparation of such nanoparticles have been described previous, for example by Asati, et al., *ACS Nano* 4(9):5321-5331 (2010). Such nanoparticles are sometimes referred to by the abbreviation "PNC," which stands for poly (acrylic acid) nanoceria. In all of the embodiments described herein, PNC can be used as cerium oxide nanoparticles coated with negatively-charged polymers. Other negatively-charged materials to make negatively-charged nanoceria can include, but are not limited to, DNA or other nucleic acids, poly(ethylene glycol) (PEG), or streptavidin.

Any plant or plant part can be contacted with cerium oxide nanoparticles coated with negatively-charged polymers. The term "plant" includes whole plants, shoot vegetative organs and/or structures (e.g., leaves, stems and tubers), roots, flowers and floral organs (e.g., bracts, sepals, petals, stamens, carpels, anthers), ovules (including egg and central cells), seed (including zygote, embryo, endosperm, and seed coat), fruit (e.g., the mature ovary), seedlings, plant tissue (e.g., vascular tissue, ground tissue, and the like), cells (e.g., guard cells, egg cells, trichomes and the like), and progeny of same. The class of plants that can be used in the method of the invention is generally as broad as the class of higher and lower plants amenable to transformation techniques, including angiosperms (monocotyledonous and dicotyledonous plants), gymnosperms, ferns, and multicellular algae. It includes plants of a variety of ploidy levels, including aneuploid, polyploid, diploid, haploid, and hemizygous.

The invention has use over a broad range of plants, including species from the genera Asparagus, *Atropa, Avena, Brassica, Citrus, Citrullus, Capsicum, Cucumis, Cucurbita, Daucus, Fragaria, Glycine, Gossypium, Helianthus, Heterocallis, Hordeum, Hyoscyamus, Lactuca, Linum, Lolium, Lycopersicon, Malta, Manihot, Majorana, Medicago, Nicotiana, Oryza, Panieum, Pannesetum, Persea, Pisum, Pyrus, Prunus, Raphanus, Secale, Senecio, Sinapis, Solanum, Sorghum, Trigonella, Triticum, Vitis, Vigna,* and, *Zea*. In some embodiments, the plant is a *Brassica* plant. In some embodiments, the plant is an ornamental plant, a turfgrass, or a plant that is not edible. In some embodiments, the plant is a vegetable- or fruit-producing plant. In some embodiments, the plant is a monocot. In some embodiments, the plant is a dicot.

In some embodiments, the plants are exposed to, or expected to undergo (e.g., within a certain time period such as within a day, within a week, or within a month) abiotic stress. As noted herein, enhanced abiotic tolerance can be induced by contacting such plants with cerium oxide nanoparticles coated with negatively-charged polymers. The term "abiotic stress" is used herein in its regular meaning as the negative impact of non-living factors on living organisms in a specific environment. "Abiotic stress tolerance" refers to the ability of an organism to tolerate abiotic stress or to recover once the stress conditions have passed. Accordingly, "enhanced abiotic stress tolerance" refers to a phenotype in which an organism, such as a plant, has greater growth, multiplication, fertility, carbon fixation or yield during an abiotic stress condition or after an abiotic stress condition has passed than an organism that does not have enhanced stress tolerance. Where a plant contacted with nanoceria is tested for tolerance, a control plant could be a plant from the same plant line that is tested under the same conditions but is not contacted with nanoceria and is optionally contacted with an inert carrier. The enhancement can be an increase of 0.1%, 0.2%, 0.3%, 0.5%, 0.75%, 1%, 1.5%, 2%, 3%, 4%, 5%, 6%, 7%, 8%, 9%, 10%, 12%, 15%, 17%, 20%, 25%, 30%, 35%, 40%, 50%, 60%, 70%, 80%, 90%, 100%, or more.

Enhanced abiotic stress tolerance can be measured in many ways. Possible abiotic stressors include but are not limited to: excess light (including but not limited to continuous light or light of excess brightness or intensity such that a non-treated plant would have detrimental effects such as, but not limited to reduced growth, chlorosis, etc.), submergence (e.g., hypoxia induced by flooding of plant roots), high amounts of heavy metals, drought, heat, hypoxia, cold, frost, high salinity, wounding, lodging or other physical insult, and changes in plant growth medium (e.g., soil) nutrient levels. One of skill in the art will recognize that responses of plants to pathogens vary depending on many factors, including what stressor or plant is used. Generally, enhanced tolerance is measured by the reduction or elimination of stress symptoms when compared to a control plant. In some cases, enhanced tolerance is measured by increased multiplication, fertility, or yield. In some cases, enhanced tolerance is measured by faster or more robust recovery after the stress condition is removed or mitigated.

Excess light conditions can occur, for example, above plant photosynthesis saturation limits. Examples of such conditions can include, for example, over 200, 400, 600, 800, 1000, 1200, 1400, 1600, 1800 or 2000 μmol m-2 s-1 of photosynthetic active radiation. High salinity conditions can range from 50, 100, 150, 200, 300, 400 mM of salts such as NaCl. Hypoxia conditions develop at concentrations of $O_2$ below 10 ppm. Heat stress promotes the accumulation of reactive oxygen species above temperatures of, for example, 30°, 35°, 40°, 45° C. Uptake of heavy metals such as cadmium, aluminum, arsenic, can lead to abiotic stress. High concentrations of heavy metals vary depending on the heavy metal but can include, for example, higher than 0.2 mM $CdCl_2$. Ozone and ultraviolet light lead to abiotic stress and accumulation of reactive oxygen species.

The present invention also provides for agricultural formulations comprising cerium oxide nanoparticles coated with a polymer coating wherein said polymer coating provides a negative surface charge formulated for contacting to plants. The formulations can be suitable for treating plants or plant propagation material, such as seeds, in accordance with the present invention, e.g., in a carrier. Suitable additives include buffering agents, wetting agents, coating agents, polysaccharides, and abrading agents. Exemplary carriers include water, aqueous solutions, slurries, solids and dry powders (e.g., peat, wheat, bran, vermiculite, clay, pasteurized soil, many forms of calcium carbonate, dolomite, various grades of gypsum, bentonite and other clay minerals, rock phosphates and other phosphorous compounds, titanium dioxide, humus, talc, alginate and activated charcoal. Any agriculturally suitable carrier known to one skilled in the art would be acceptable and is contemplated for use in the present invention. Optionally, the formulations can also include at least one surfactant, herbicide, fungicide, pesticide, or fertilizer.

Treatment can be performed using a variety of known methods, e.g., by spraying, atomizing, dusting or scattering the compositions over the propagation material or brushing or pouring or otherwise contacting the compositions over the plant or, in the event of seed, by coating, encapsulating, or otherwise treating the seed. In an alternative to directly treating a plant or seed before planting, the formulations can also be introduced into the soil or other media into which the seed is to be planted. In some embodiments, a carrier is also used in this embodiment. The carrier can be solid or liquid, as noted above. In some embodiments peat is suspended in water as a carrier of the cerium oxide nanoparticles, and this mixture is sprayed into the soil or planting media and/or over the seed as it is planted. In some embodiments, the plants are grown hydroponically (in a nutrient solution without soil) and the formulation is applied to or is part of the nutrient solution). This last aspect is useful for example in aspects in which the hydroponically-grown plants are grown under excessive or constant (e.g., 24-hour) light.

The amount or concentration of cerium oxide nanoparticles applied to a plant can vary depending on desired result and the specific plant. In some embodiments, the cerium oxide nanoparticle formulations applied to a plant vary from 0.01 to 100 mM cerium oxide nanoparticles, for example from 0.1 to 1 mM.

EXAMPLES

The following examples are offered to illustrate, but not limit the claimed invention.

Excess light is a main cause of reduction in plant light energy absorption efficiency and carbon assimilation. Herein, we use a nanobionic approach for augmenting plant photoprotection and photosynthetic performance under light stress. Cerium oxide nanoparticles (nanoceria) improve *Arabidopsis* maximum quantum yield of photosystem II (10%) and carbon assimilation (19%) by protecting leaf mesophyll chloroplasts from damaging reactive oxygen species (ROS). Nanoceria augments scavenging of superoxide and hydroxyl radicals; for the latter ROS there is no known chloroplast enzyme scavenger. Chloroplast in vivo colocalization with negatively charged poly (acrylic acid) nanoceria (PNC) is significantly higher than with positively charged aminated poly (acrylic acid) nanoceria (ANC). The transport of nanoceria through leaf cells is endocytosis independent and affected by the plasma membrane potential. Although both PNC and ANC significantly reduce leaf mesophyll ROS, only PNC augments photosynthesis under light stress. PNC also enables plant growth under continuous excess light with higher leaf chlorophyll content than controls. Nanobionic plants with augmented photoprotection may lead to crops with enhanced yield and tolerance to excess and continuous light.

Introduction

Light that exceeds the capacity of photosynthesis to use it for carbon assimilation results in levels of ROS that cannot be controlled by the natural scavenging mechanisms of plants (Li, Z., Wakao, S., Fischer, B. B. & Niyogi, K. K. Sensing and responding to excess light. *Annu. Rev. Plant Biol.* 60, 239-60 (2009); Velez-Ramirez, A. I., Van Ieperen, W., Vreugdenhil, D. & Millenaar, F. F. Plants under continuous light. *Trends Plant Sci.* 16, 310-318 (2011)). Photooxidative damage has been identified as one of the main causes of injury in *Arabidopsis*, tomato and tobacco crops (Velez-Ramirez, A. I., Van Ieperen, W., Vreugdenhil, D. & Millenaar, F. F. Plants under continuous light. *Trends Plant Sci.* 16, 310-318 (2011); Peter, E. et al. Mg protoporphyrin monomethylester cyclase deficiency and effects on tetrapyrrole metabolism in different light conditions. *Plant Cell Physiol.* 51, 1229-1241 (2010); Pulido, P. et al. Functional analysis of the pathways for 2-Cys peroxiredoxin reduction in *Arabidopsis thaliana* chloroplasts. *J. Exp. Bot.* 61, 4043-4054 (2010); Yabuta, Y. et al. Light regulation of ascorbate biosynthesis is dependent on the photosynthetic electron transport chain but independent of sugars in *Arabidopsis. J. Exp. Bot.* 58, 2661-2671 (2007)). Continuous light leads to plant chlorosis, necrosis, and reductions in photosynthetic capacity, Rubisco carboxylation, quantum yield and electron transport rates (Velez Ramirez, A. I., Van Ieperen, W., Vreugdenhil, D. & Millenaar, F. F. Plants under continuous light. *Trends Plant Sci.* 16, 310-318 (2011)) and the accumulation of antioxidants in *Arabidopsis* plants (Yabuta, Y. et al. Light regulation of ascorbate biosynthesis is dependent on the photosynthetic electron transport chain but independent of sugars in *Arabidopsis. J. Exp. Bot.* 58, 2661-2671 (2007)). Nanoceria is well positioned to minimize oxidative plant stress associated with excess light or continuous light. Unlike other antioxidants, nanoceria could catalytically reduce oxidative stress in plants by regenerating the sites in the cerium oxide lattice that scavenge ROS (Giraldo, J. P. et al. Plant nanobionics approach to augment photosynthesis and biochemical sensing. *Nat. Mater.* 13, 400-408 (2014); Perez, J. M., Asati, A., Nath, S. & Kaittanis, C. Synthesis of biocompatible dextran-coated nanoceria with pH-dependent antioxidant properties. *Small* 4, 552-6 (2008)). Nanoceria catalytic scavenging of ROS may promote the light reactions of photosynthesis by reducing photo-oxidative damage to chloroplast thylakoid integral proteins and lipids involved in light energy capture and conversion to electron flow.

Photoprotection of the chloroplast photosystems and carboxylation enzymes by nanoceria can also lead to improved plant carbon fixation in leaves under light stress. Excess light results in photosynthesis decline by photoinhibition (Ögren, E. & Sjöström, M. Estimation of the effect of photoinhibition on the carbon gain in leaves of a willow canopy. *Planta* 181, 560-567 (1990)) and a substantial reduction in crop carbon gain (Burgess, A. J. et al. High-resolution three-dimensional structural data quantify the impact of photoinhibition on long-term carbon gain in wheat canopies in the field. *Plant Physiol.* 169, 1192-1204 (2015)). Similarly, continuous light has been shown to directly impact carbon fixation by lowering maximum rates of Ribulose-1,5-bisphosphate carboxylase/oxygenase (Rubisco) carboxylation (Van Gestel, N. C. et al. Continuous light may induce photosynthetic downregulation in onion—Consequences for growth and biomass partitioning. *Physiol. Plant.* 125, 235-246 (2005)). Nanoceria can enable higher rates of carboxylation under light induced oxidative stress by reducing ROS damage to key enzymes of the carbon reactions of photosynthesis such as Rubisco. Creating nanobionic plants with augmented photoprotection and enhanced photosynthesis under light stress provides new tools for plant photosynthesis research. It also opens pathways to transform field farming and indoor agriculture with nanobiotechnology. This innovation can give rise to nanobionic crops with enhanced yields under excess light in the field and increased tolerance to continuous light for indoor farming.

Herein, we localize nanoceria inside chloroplasts in vivo for creating nanobionic *Arabidopsis* plants with augmented ROS scavenging, higher light absorption efficiency and carbon assimilation under light stress. We determined that nanoceria uptake by leaf mesophyll cells is facilitated by coating the nanoparticles with negatively charged polymers. Our results indicate that the outer and positively charged apoplastic side of the leaf mesophyll cell membranes preferentially attracts negatively charged nanoceria. In vivo transport of nanoceria through the leaf mesophyll cell membranes into chloroplasts is endocytosis independent, consistent with previously reported passive uptake of charged nanoparticles through lipid bilayers in extracted chloroplasts (Wong, M. H. et al. Lipid exchange envelope penetration (LEEP) of nanoparticles for plant engineering: a universal localization mechanism. *Nano Lett.* 16, 1161-1172 (2016)). Nanoceria localized at the sites of ROS generation of chloroplasts significantly reduce levels of ROS enhancing the plant light absorption efficiency. Augmenting ROS scavenging in *Arabidopsis* leaves enables both higher plant carboxylation rates and maximum carbon assimilation under excess light. The nanobionic *Arabidopsis* plants also become more tolerant to continuous excess light maintaining higher levels of leaf chlorophyll content.

Mechanisms of Nanoceria Transport into Leaf Mesophyll Chloroplasts

Negatively charged PNC and positively charged aminated poly (acrylic acid) nanoceria (ANC) were synthesized as in Asati et al (Asati, A., Santra, S., Kaittanis, C. & Perez, J. M. Surface-charge-dependent cell localization and cytotoxicity of cerium oxide nanoparticles. *ACS Nano* 4, 5321-31 (2010)). Dynamic light scattering measurements (Nano S, Malvern) showed PNC and ANC monodisperse solutions of similar hydrodynamic diameter, 10.3±0.6 and 12.6±1.5 nm, respectively (P>0.05) (FIG. 7a). Zeta potential characterization (Nano ZS 90, Malvern) confirmed the presence of negative charge for PNC, −16.9±2.7 mV, and positive charge for ANC, 9.7±0.7 mV (FIG. 7b). PNC and ANC had peaks of absorbance at 271 nm and 260 nm, respectively (FIG. 7c). The polymer surface coating of PNC and ANC was further characterized by Fourier transform infrared spectroscopy (FTIR) analysis (FIG. 7d).

Figure 1A:
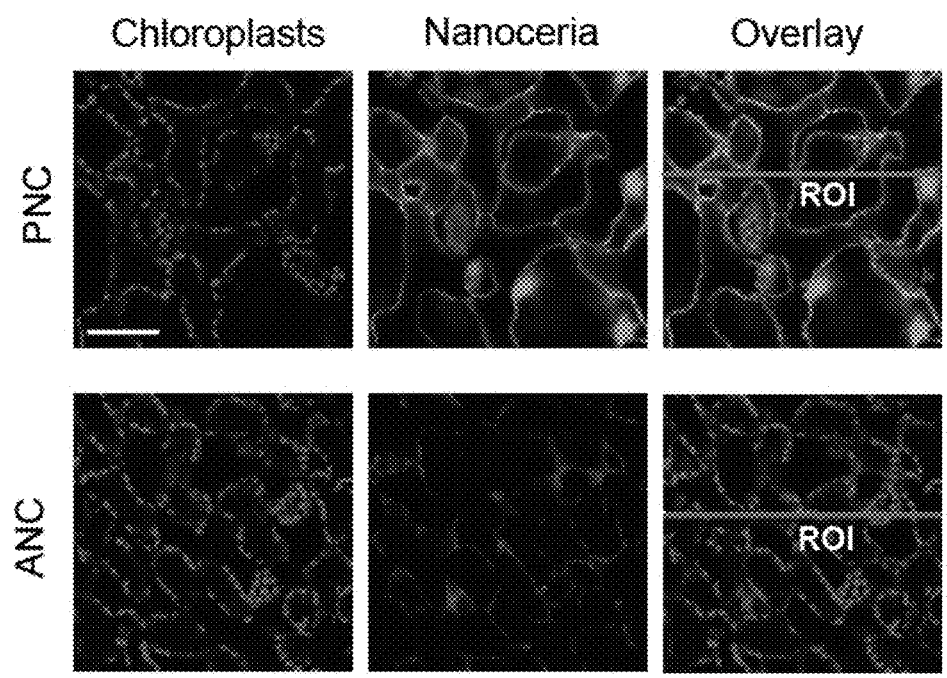
FIGS. 1A-1C Nanoceria colocalization with chloroplasts in leaf mesophyll cells. Representative confocal images showing colocalization of chloroplast chlorophyll fluorescence with FIG. 1A, negatively charged poly (acrylic acid) nanoceria (PNC) and, positively charged aminated poly (acrylic acid) nanoceria (ANC). *Arabidopsis* leaves were infiltrated with nanoceria at 24° C. Nanoceria were labeled with DiI fluorescent dye.
Figure 1B:
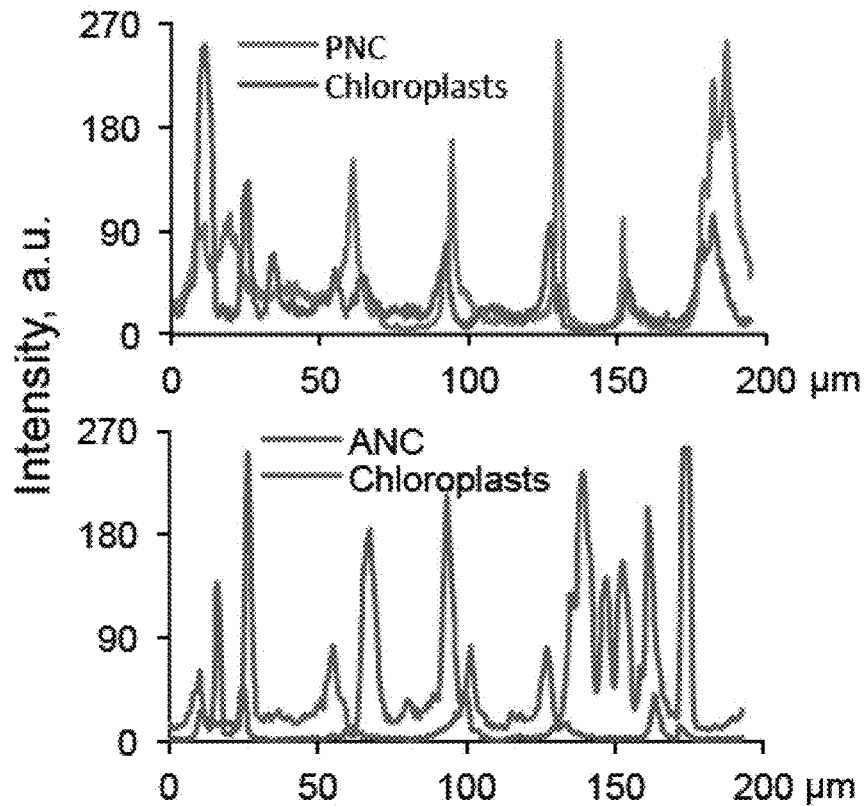
Figure 1C:
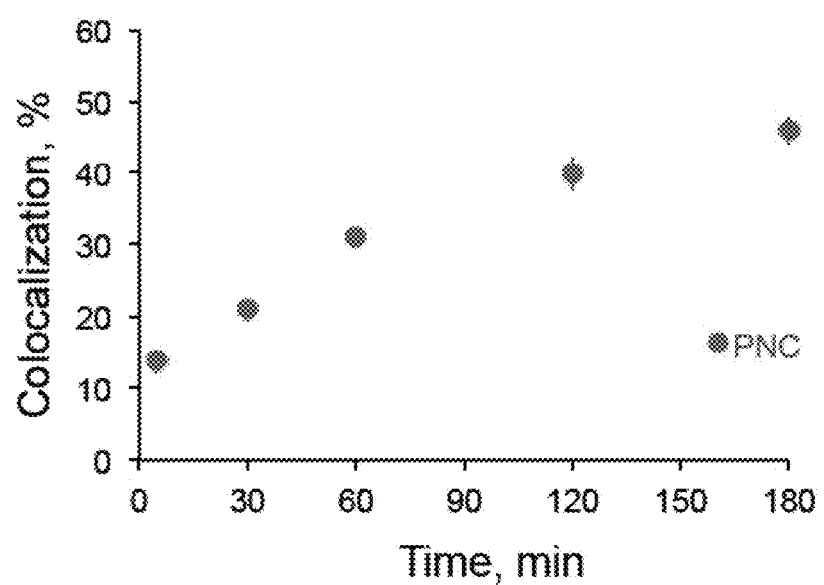
Figure 2A:
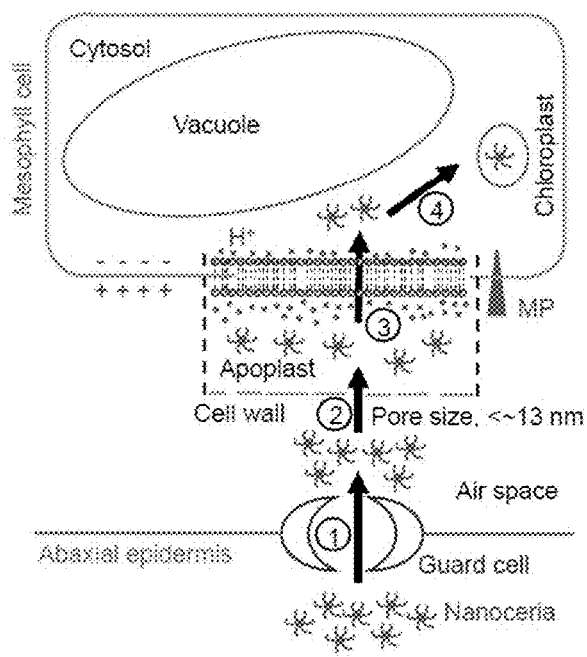
FIGS. 2A-2D Mechanisms of nanoceria transport into leaf mesophyll chloroplasts.
Figure 2B:
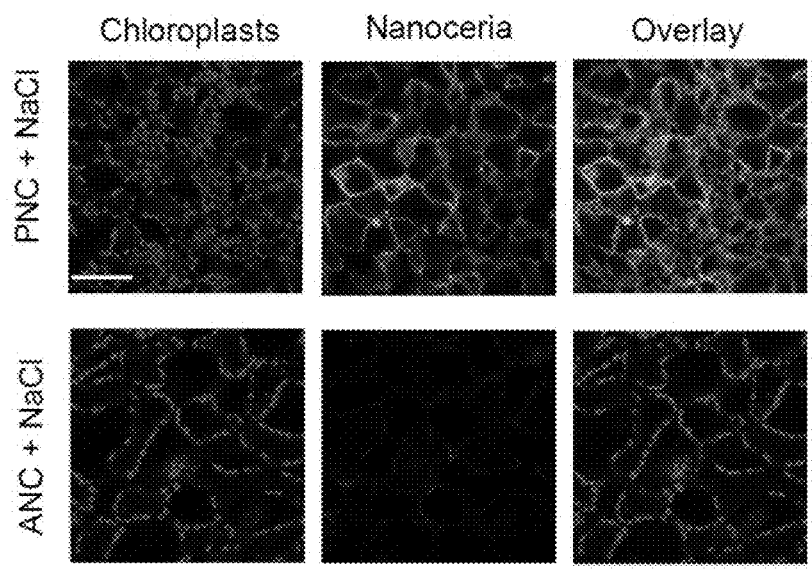
Figure 2C:
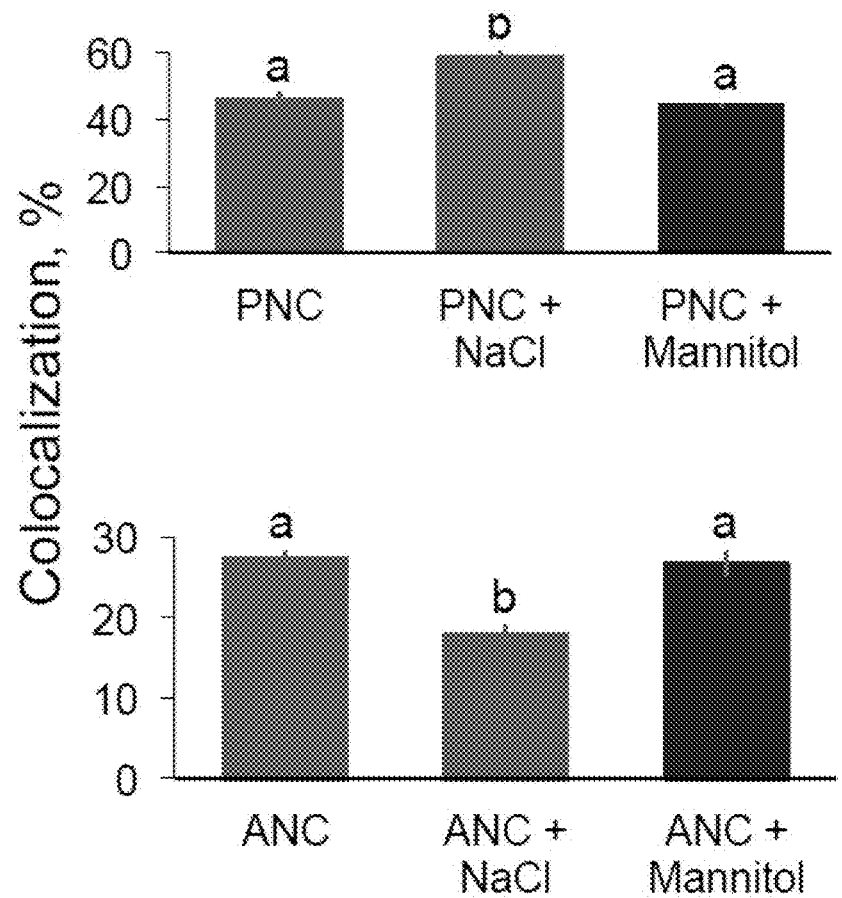
Figure 2D:
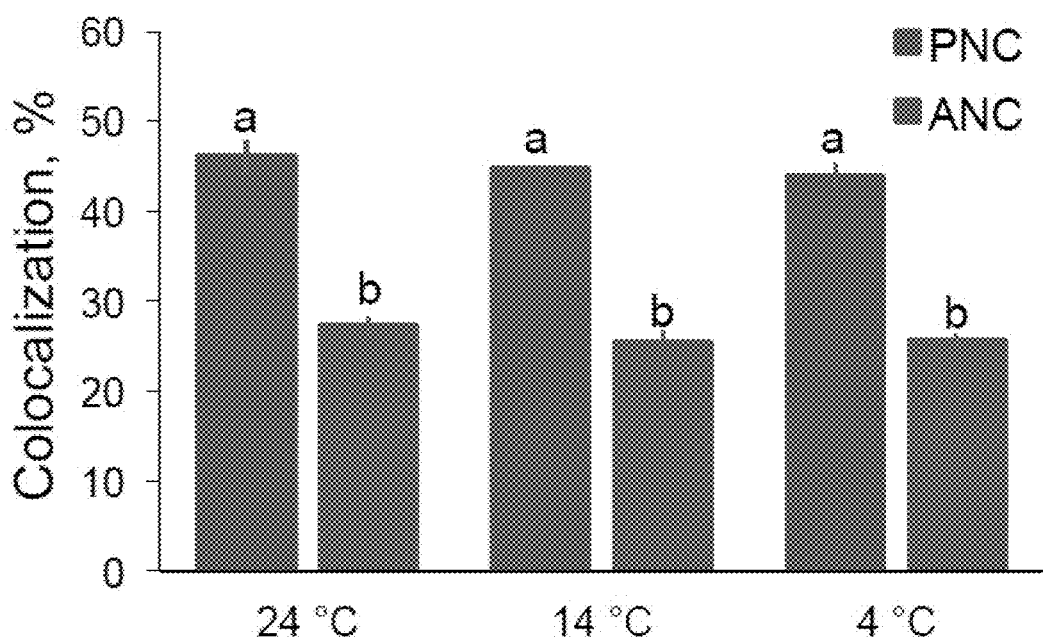

The delivery of nanoceria particles to leaf mesophyll chloroplasts was performed by a simple method of infiltration through the stomata pores in the *Arabidopsis* leaf lamina (FIG. 2a, see Methods). A concentration of 450 µM nanoceria was chosen for leaf infiltration. This concentration did not have a significant impact on leaf chlorophyll content and lifespan under growth chamber conditions (FIG. 8, see Methods). Nanoceria was labeled with the fluorescent dye 1,1'-Dioctadecyl-3,3,3',3'-tetramethylindocarbocyanine perchlorate (DiI) as in Asati et al. (Asati, A., Santra, S., Kaittanis, C. & Perez, J. M. Surface-charge-dependent cell localization and cytotoxicity of cerium oxide nanoparticles. *ACS Nano* 4, 5321-31 (2010)). for confocal imaging in leaf tissues. PNC showed significantly higher colocalization with chloroplasts (46.0%±1.9%) than ANC (27.3%±1.0%) (FIG. 1a, b, FIG. 2d). Similarly, mammalian cells preferentially uptake negatively charged cerium oxide nanoparticles than positively charged nanoparticles (Patil, S., Sandberg, A., Heckert, E., Self, W. & Seal, S. Protein adsorption and cellular uptake of cerium oxide nanoparticles as a function of zeta potential. *Biomaterials* 28, 4600-4607 (2007)). No fluorescence signal was detected in leaves infiltrated with TES buffer solution (10 mM TES, 10 mM $MgCl_2$, pH 7.5) (FIG. 11a). Highly positively and negatively charged nanoparticles, with zeta potential magnitude higher than 30 mV, have been shown to spontaneously penetrate the lipid envelopes of extracted chloroplasts (Wong, M. H. et al. Lipid exchange envelope penetration (LEEP) of nanoparticles for plant engineering: a universal localization mechanism. *Nano Lett.* 16, 1161-1172 (2016)). Herein, we report the uptake of PNC and ANC into chloroplasts in vivo, having zeta potentials of less magnitude, −16.9±2.7 mV and 9.7±0.7 mV, respectively. These results indicate that nanoparticles of lower zeta potential magnitudes than previously reported (Wong, M. H. et al. Lipid exchange envelope penetration (LEEP) of nanoparticles for plant engineering: a universal localization mechanism. *Nano Lett.* 16, 1161-1172 (2016)) can penetrate the lipid bilayers of chloroplasts in vivo. Nanoceria appears to move rapidly from air cellular spaces, mesophyll cell walls and membranes into chloroplasts in vivo (FIG. 2a). Nanoceria were found in chloroplasts two minutes after leaf infiltration. The percentage of PNC colocalization with chloroplasts in leaf mesophyll cells increased linearly from 5 min (13.8%±1.4%) to 30 min (20.9%±0.9%), and 60 min (31.1%±1.2%) (FIG. 1c, FIG. 9). The PNC uptake into chloroplast reached its highest-level about 180 min after leaf infiltration (46.0%±1.9%) (FIG. 1c, FIG. 9). Nanoceria hydrodynamic radius below the plant cell wall pore size (less than ~13 nm) (Albersheim, P., Darvill, A., Roberts, K., Sederoff, R. & Staehelin, A. Cell walls and plant anatomy. *Plant Cell Walls* 241-242 (2011)) may facilitate their fast transport across the *Arabidopsis* leaf mesophyll. Initial experiments were also attempted in tomato but were inconclusive.

Before reaching the chloroplasts in vivo, nanoceria necessarily has to cross a leaf mesophyll cell membrane. We observed higher colocalization of negatively charged PNC than positively charged ANC within chloroplasts in leaf mesophyll cells. We propose that these differences in colocalization can be in part explained by the interaction between the nanoparticle's zeta potential and the cell plasma membrane potential. The outside of the cell plasma membrane has a net positive charge that preferentially binds to negatively charged nanoparticles. In mammalian cells, anionic nanoparticles show a high affinity for the cell membrane (Wilhelm, C. et al. Intracellular uptake of anionic superparamagnetic nanoparticles as a function of their surface coating. *Biomaterials* 24, 1001-1011 (2003)). Cellular binding of cationic nanoparticles is minimally affected by membrane potential in mammalian cells whereas cellular binding of anionic nanoparticles is sensitive to membrane potential change (Shin, E. H. et al. Membrane potential mediates the cellular binding of nanoparticles. *Nanoscale* 5, 5879-5886 (2013)). Preferential cellular uptake of the negatively but not positively charged cerium oxide nanoparticles has been also reported in mammalian cells (Patil, S., Sandberg, A., Heckert, E., Self, W. & Seal, S. Protein adsorption and cellular uptake of cerium oxide nanoparticles as a function of zeta potential. *Biomaterials* 28, 4600-4607 (2007)). We performed a depolarization of the plasma membrane potential to investigate its role in the transport of nanoceria across the leaf mesophyll cell membrane. The plant plasma membrane potential is primarily built by $H^+$ electrochemical gradient (Sze, H., Li, X. & Palmgren, M. Energization of plant cell membranes by $H^+$-pumping ATPases: Regulation and biosynthesis. *Plant Cell* 11, 677-690 (1999); Palmgren, M. G. Plant plasma membrane $H^+$-ATPases. *Evolution (N. Y)*. 52, 817-845 (2001); Falhof, J., Pedersen, J. T., Fuglsang, A. T. & Palmgren, M. Plasma membrane $H^+$-ATPase regulation in the center of plant physiology. *Mol. Plant* 9, 323-337 (2015)) and can be depolarized by applying NaCl (Shabala, S. et al. Extracellular $Ca^{2+}$ ameliorates NaCl-induced $K^+$ loss from *Arabidopsis* root and leaf cells by controlling plasma membrane $K^+$-permeable channels. *Plant Physiol.* 141, 1653-1665 (2006); Chen, Z. et al. Root plasma membrane transporters controlling $K^+/Na^+$ homeostasis in salt-stressed barley. *Plant Physiol.* 145, 1714-1725 (2007); Bose, J. et al. Rapid regulation of the plasma membrane $H^+$-ATPase activity is essential to salinity tolerance in two halophyte species, *Atriplex lentiformis* and *Chenopodium quinoa*. *Ann. Bot.* 115, 481-494 (2015)). Plasma membrane potential is approximately −140 mV in plants at non-stress conditions (Sze, H., Li, X. & Palmgren, M. Energization of plant cell membranes by $H^+$-pumping ATPases: Regulation and biosynthesis. *Plant Cell* 11, 677-690 (1999); Carpaneto, A. et al. Cold transiently activates calcium-permeable channels in *Arabidopsis* mesophyll cells. *Plant Physiol.* 143, 487-494 (2006)). After applying 50-100 mM NaCl the recovered steady state plasma membrane potential is two to three folds lower of the non-stressed one (Chen, Z. et al. Root plasma membrane transporters controlling $K^+/Na^+$ homeostasis in salt-stressed barley. *Plant Physiol.* 145, 1714-1725 (2007); Bose, J. et al. Rapid regulation of the plasma membrane $H^+$-ATPase activity is essential to salinity tolerance in two halophyte species, *Atriplex lentiformis* and *Chenopodium quinoa*. *Ann. Bot.* 115, 481-494 (2015); Shabala, S., Cuin, T. A. & Pottosin, I. Polyamines prevent NaCl-induced $K^+$ efflux from pea mesophyll by blocking non-selective cation channels. *FEBS Lett.* 581, 1993-1999 (2007); Jayakannan, M., Bose, J., Babourina, O., Rengel, Z. & Shabala, S. Salicylic acid improves salinity tolerance in *Arabidopsis* by restoring membrane potential and preventing salt-induced $K^+$ loss via a GORK channel. *J. Exp. Bot.* 64, 2255-2268 (2013)). In the present study, we observed a significant increase of 27% (P<0.05) in colocalization of chloroplasts with PNC when the leaf mesophyll cell membranes were depolarized with 100 mM NaCl (FIG. 2b, c). In contrast, ANC colocalization with chloroplasts significantly decreased (P<0.05) from 27.3%±1.0% (ANC) to 18.0%±1.2% (ANC+NaCl) (FIG. 2b, c). To eliminate possible confounding effects of osmotic change by applying 100 mM NaCl, a non-ionic isotonic solution (170 mM mannitol) was used for plant infiltration together with PNC and ANC. Similar chloroplast colocalization levels (P>0.05) were found between plants infiltrated with PNC and PNC+mannitol (FIG. 2b, c; FIG. 10a) or ANC and ANC+mannitol (FIG. 2b, c; FIG. 10b). These results indicate that depolarizing the plasma membrane potential reduces the electrical gradient opposing the transport of negatively charged nanoparticles into the leaf mesophyll cells thus favoring the uptake of negatively charged PNC (FIG. 2b, c). Compared with ~−140 mV of the plasma membrane potential, the chloroplast membrane potential is only ~+40 mV (Shahak, Y., Admon, A. & Avron, M. Transmembrane electrical potential formation by chloroplast ATPase complex (CF1-CF0) proteoliposomes. *FEBS Lett.* 150, 27-31 (1982)). Changes in colocalization percentage of nanoceria with leaf mesophyll chloroplasts are likely attributed to the depolarization of the leaf mesophyll membrane potential. In mammalian cells, amine-modified nanoparticles but not carboxylate-modified nanoparticles cause significant depolarization of the plasma membrane (Warren, E. A. K. & Payne, C. K. Cellular binding of nanoparticles disrupts the membrane potential. *RSC Adv* 5, 13660-13666 (2015)), suggesting that charged nanoparticles can also disrupt the lipid bilayer as they enter the cells. This study echoes a recent finding that chloroplast lipid bilayers are disrupted by the nanoparticle ionic cloud facilitating their transport into the chloroplast (Wong, M. H. et al. Lipid exchange envelope penetration (LEEP) of nanoparticles for plant engineering: a universal localization mechanism. *Nano Lett.* 16, 1161-1172 (2016)).

Figure 11:
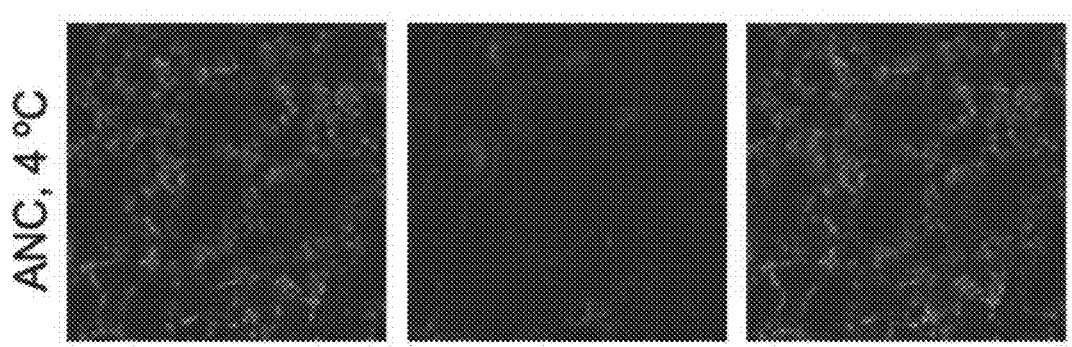

Nanoceria transport through leaf mesophyll cell membranes is endocytosis independent. Nanoceria colocalization with chloroplasts was not significantly different in plants infiltrated with PNC or ANC at temperatures ranging from 24° C. down to 14° C. and 4° C. (FIG. 2d, FIG. 11). The lack of temperature effect on nanoceria colocalization with chloroplasts suggests that the transport of these nanoparticles occurs via non-endocytic pathways. Furthermore, we inhibited endocytosis in the plasma membrane with a well-known inhibitor auxin (Paciorek, T. et al. Auxin inhibits endocytosis and promotes its own efflux from cells. *Nature* 435, 1251-1256 (2005); Robert, S. et al. ABP1 mediates auxin inhibition of clathrin-dependent endocytosis in *arabidopsis*. *Cell* 143, 111-121 (2010)). No significant changes in nanoceria chloroplast uptake were found between plants infiltrated with nanoceria and nanoceria+auxin (FIG. 12). Together these results demonstrate that the uptake of both PNC and ANC into leaf chloroplasts is independent of cell endocytosis in the leaf mesophyll. To the best of our knowledge, this is the first study demonstrating non-endocytic transport of nanoparticles in leaves. In contrast, studies in mammalian cells have shown that the uptake of nanoceria is governed by energy dependent endocytic pathways (Singh, S., Kumar, A., Karakoti, A., Seal, S. & Self, W. T. Unveiling the mechanism of uptake and sub-cellular distribution of cerium oxide nanoparticles. *Mol. Biosyst.* 6, 1813-1820 (2010)). Other nanoparticles such as DNA coated single walled carbon nanotubes have been reported to be transported into cultured plant cells by endocytosis whereas nanosheets are internalized in plant root cells via non-endocytic pathways (Liu, Q. L. et al. Carbon nanotubes as molecular transporters for walled plant cells. *Nano Lett.* 9, 1007-1010 (2009); Bao, W., Wang, J., Wang, Q., O'Hare, D. & Wan, Y. Layered double hydroxide nanotransporter for molecule delivery to intact plant cells. *Sci. Rep.* 6, 26738 (2016)).

Nanoceria Scavenging of Reactive Oxygen Species in the Leaf Mesophyll

Chloroplasts are the main source of reactive oxygen species such superoxide anion, hydrogen peroxide, and hydroxyl radicals in plants. These damaging ROS can impair the chloroplast photosystems (Song, Y. G., Liu, B., Wang, L. F., Li, M. H. & Liu, Y. Damage to the oxygen-evolving complex by superoxide anion, hydrogen peroxide, and hydroxyl radical in photoinhibition of photosystem II. *Photosynth. Res.* 90, 67-78 (2006)) and degrade their lipid membranes (Gill, S. S. & Tuteja, N. Reactive oxygen species and antioxidant machinery in abiotic stress tolerance in crop plants. *Plant Physiol. Biochem.* 48, 909-930 (2010)). Plant photosystem I (PSI) is one of the main sources of superoxide anion and hydrogen peroxide (Gill, S. S. & Tuteja, N. Reactive oxygen species and antioxidant machinery in abiotic stress tolerance in crop plants. *Plant Physiol. Biochem.* 48, 909-930 (2010)). Hydrogen peroxide can be transformed via Fenton reaction in stroma to hydroxyl radicals, the most destructive ROS in plant cells (Upham, B. L. & Jahnke, L. S. Photooxidative reactions in chloroplast thylakoids. Evidence for a Fenton-type reaction promoted by superoxide or ascorbate. *Photosynth. Res.* 8, 235-247 (1986); Apel, K. & Hirt, H. Reactive oxygen species: metabolism, oxidative stress, and signal transduction. *Annu. Rev. Plant Biol.* 55, 373-399 (2004)). The cerium oxide lattice in nanoceria particles has large surface to volume ratios with oxygen vacancies, resulting in numerous dynamic defect sites with dangling $Ce^{3+}$ bonds that effectively scavenge oxygen radicals produced by the chloroplast photosynthetic machinery such as superoxide and hydroxyl radicals (Boghossian, A. A. et al. Application of nanoparticle antioxidants to enable hyperstable chloroplasts for solar energy harvesting. *Adv. Energy Mater.* 3, 881-893 (2013)).

Unlike superoxide anion and hydrogen peroxide, no specific scavenging enzyme for hydroxyl radicals has been found in chloroplasts (Song, Y. G., Liu, B., Wang, L. F., Li, M. H. & Liu, Y. Damage to the oxygen-evolving complex by superoxide anion, hydrogen peroxide, and hydroxyl radical in photoinhibition of photosystem II. *Photosynth. Res.* 90, 67-78 (2006)). Thus, delivering nanoceria into chloroplast is a promising way to augment ROS scavenging ability in leaves (FIG. 3a). In chloroplasts, nanoceria can catalytically scavenge ROS such as hydroxyl radicals ($OH^\cdot$) and superoxide ($O_2^-$) via the following reactions:

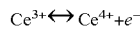

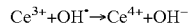

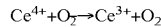

We monitored ROS generation in leaf mesophyll cells infiltrated with PNC or ANC. We used DHE (dihydroethidium) dye for confocal imaging (Leica SP5) of superoxide anion and $H_2$-DCFDA (2',7'-dichlorodihydrofluorescein diacetate) for hydrogen peroxide.

DHE can freely permeate cell membranes and form a red fluorescent product 2-hydroxyethidium by reaction with superoxide anions (Zhao, H. et al. Detection and characterization of the product of hydroethidine and intracellular superoxide by HPLC and limitations of fluorescence. *Proc. Natl. Acad. Sci. U.S.A.* 102, 5727-32 (2005)). Upon interaction with ROS such as $H_2O_2$, $H_2$-DCFDA is converted to its fluorescence form DCF (2',7'-dichlorofluorescein). We induced ROS generation via exposing leaf discs to UV-A light (405 nm). In vivo monitoring of DHE fluorescence showed that PNC and ANC infiltrated plants generate significantly less superoxide anion in leaf mesophyll cells than buffer infiltrated leaves (controls) after 1 min and 2.5 min of UV-A stress, respectively (P<0.05) (FIG. 3b, c). Likewise, changes in DCF fluorescence intensity indicated that PNC and ANC have a strong scavenging effect on ROS such as hydrogen peroxide in mesophyll cells (FIG. 3b, c). Overall, our results demonstrate that both PNC and ANC are potent in vivo ROS scavengers in leaves.

Enhanced Leaf Light Absorption Efficiency and Carbon Assimilation Enabled by Nanoceria Nanoceria has the potential to improve photosynthesis in plants under excess light by reducing ROS associated damage and repair of susceptible components of the chloroplast photosynthetic machinery such as the D1 protein and oxygen evolving complex in PSII (Song, Y. G., Liu, B., Wang, L. F., Li, M. H. & Liu, Y. Damage to the oxygen-evolving complex by superoxide anion, hydrogen peroxide, and hydroxyl radical in photoinhibition of photosystem II. *Photosynth. Res.* 90, 67-78 (2006); Edelman, M. & Mattoo, A. K. D1-protein dynamics in photosystem II: the lingering enigma. *Photosynth. Res.* 98, 609-20 (2008)), thylakoid membrane lipids, and chloroplast DNA (Arora, A., Sairam, R. & Srivastava, G. Oxidative stress and antioxidative system in plants. *Curr. Sci* 82, 1227-1238 (2002)). Herein, we assessed the impact of excess light on a number of photosynthetic parameters in leaves infiltrated with PNC (PNC-Leaves) and ANC (ANC-Leaves) using a GFS-3000 gas exchange analyzer and fluorometer (Walz). After leaves were exposed to excess light for 1.5 h (2000 μmol $m^{-2}$ $s^{-1}$ of photosynthetic active radiation, PAR), PNC promoted up to 19% higher (P<0.05) quantum yield (QY) in leaves than in buffer infiltrated controls (FIG. 4a). Thus PNC enhance the proportion of absorbed energy used for photochemistry under excess light. Similarly, PNC-Leaves had a 10% higher maximum yield of PSII (Fv/Fm) than controls infiltrated with buffer (P<0.05) (FIG. 4b). No differences in QY and Fv/Fm were found between ANC-Leaves and controls (FIG. 4a, b). The higher QY and Fv/Fm values in leaves with PNC relative to controls reflect improved quantum efficiency of PSII, an indicator of plant photosynthetic performance. However, the Fv/Fm values for PNC-Leaves (0.65±0.01), ANC-Leaves (0.60±0.01), and buffer infiltrated leaves (0.59±0.01) were lower than optimal values around 0.83 for most plant species (Murchie, E. H. & Lawson, T. Chlorophyll fluorescence analysis: A guide to good practice and understanding some new applications. *J. Exp. Bot.* 64, 3983-3998 (2013)), indicating a degree of light induced stress across all treatments (FIG. 4b).

Photosynthetic $CO_2$ assimilation (A) light curves measured after leaves were exposed to excess light for 1.5 h indicated up to 40% higher A in PNC-Leaves (at 50 μmol $m^{-2}$ $s^{-1}$ PAR, P<0.05) than controls treated with buffer (FIG. 4c). In PNC-Leaves, higher A was observed at a broad range of PAR both within the photosynthesis light limited region and beyond the light saturation point above 1200 μmol $m^{-2}$ $s^{-1}$ PAR (FIG. 4c). Differences in A across treatments were not associated to changes in stomatal conductance (Gs, FIG. 4d). To the contrary, PNC-Leaves and controls had similar Gs whereas ANC-Leaves had significantly higher Gs. Instead, PNC-Leaves had significantly enhanced quantum efficiency of $CO_2$ uptake ($\varphi CO_2$) (0.0247±0.0010) relative to buffer controls (0.0215±0.0008) (P<0.05) (FIG. 4e). PNC augmentation of $CO_2$ assimilation is therefore associated with higher light absorption efficiency. However, other factors that become limiting to photosynthesis beyond the light saturation point, such as Rubisco carboxylation, are likely responsible for the improvement in A.

Under excess light, the response of A to internal intercellular mole fraction of $CO_2$ (ci) (A Ci curve), showed a significantly higher A (up to 19% increase) in PNC-Leaves than buffer infiltrated leaves from 160 to 745 ppm ci, compared with no difference between ANC-Leaves and controls (FIG. 4f). PNC enhances in vivo Rubisco carboxylation activity ($Vc_{max}$). PNC-Leaves exhibited significantly higher $Vc_{max}$ (137.7±9.9 µmol $CO_2$ $m^{-2}$ $s^{-1}$) than controls (111.2±7.2 µmol $CO_2$ $m^{-2}$ $s^{-1}$) whereas ANC had no significant impact on $Vc_{max}$ (FIG. 4g) (Sharkey, T. D., Bernacchi, C. J., Farquhar, G. D. & Singsaas, E. L. Fitting photosynthetic carbon dioxide response curves for C3 leaves. Plant, Cell Environ. 30, 1035-1040 (2007); Gu, L., Pallardy, S. G., Tu, K., Law, B. E. & Wullschleger, S. D. Reliable estimation of biochemical parameters from C3 leaf photosynthesis-intercellular carbon dioxide response curves. Plant, Cell Environ. 33, 1852-1874 (2010)). Maximum carbon assimilation rates for PNC-Leaves were also higher in the region limited by Ribulose-1,5-bisphosphate (RuBP) regeneration, above ~300 ppm ci. These results highlight that PNC protects key components of the carbon reactions of photosynthesis from ROS damage and enables more efficient carboxylation under light stress.

To further understand the photoprotection role of nanoceria, plants were subject to UV-B light (302 nm) for 1.5 h. We focused our experiments on PNC as this was the most efficient type of nanoceria in augmenting photosynthesis under excess PAR. UV-B light is known to be harmful to plant photosynthesis and can lead to accumulation of excess ROS in chloroplast (Joshi, P., Gartia, S., Pradhan, M. K. & Biswal, B. Photosynthetic response of clusterbean chloroplasts to UV-B radiation: Energy imbalance and loss in redox homeostasis between QA and QB of photosystem II. Plant Sci. 181, 90-95 (2011); Czegeny, G. et al. Hydrogen peroxide contributes to the ultraviolet-B (280-315 nm) induced oxidative stress of plant leaves through multiple pathways. FEBS Lett. 588, 2255-2261 (2014)). PNC effectively protected PSII from ROS damage during UV-B light exposure for 1.5 h as evidenced by a significantly higher Fv/Fm in PNC-Leaves (0.64±0.01) than controls (0.56±0.03) ($P<0.05$) (FIG. 5a). However, the Fv/Fm values below 0.65 evidenced damage to the chloroplast photosystems despite nanoceria photoprotection. After UV-B light stress, PNC-Leaves maintained a better overall photosynthetic performance with significantly higher A, $\varphi CO_2$, and Gs than controls (FIG. 5b-d) ($P<0.05$). These results support that PNC promotes higher plant light energy absorption efficiency and carbon uptake despite significant damage to photosystems by light stress.

Nanobionic Plants with Higher Tolerance to Continuous Excess Light

Plants often encounter light intensities that exceed their photosynthetic capacity (Ort, D. R. When there is too much light. Plant Physiol. 125, 29-32 (2001)) generating damaging ROS (Li, Z., Wakao, S., Fischer, B. B. & Niyogi, K. K. Sensing and responding to excess light. Annu. Rev. Plant Biol. 60, 239-60 (2009)). Photoinactivation of PSII is caused by excess light energy that is neither used for photosynthetic electron transport nor dissipated as heat (Kato, M. C., Hikosaka, K., Hirotsu, N., Makino, A. & Hirose, T. The excess light energy that is neither utilized in photosynthesis nor dissipated by photoprotective mechanisms determines the rate of photoinactivation in photosystem II. Plant Cell Physiol. 44, 318-325 (2003)). In Arabidopsis, a significant drop of $F_v/F_m$ is induced under diurnal excess light (1300 µmol $m^{-2}$ $s^{-1}$) (Ksas, B., Becuwe, N., Chevalier, A. & Havaux, M. Plant tolerance to excess light energy and photooxidative damage relies on plastoquinone biosynthesis. Sci. Rep. 5, 10919 (2015)). Continuous light severe negative impact on plant health has been also associated with ROS generation (Velez-Ramirez, A. I., Van Ieperen, W., Vreugdenhil, D. & Millenaar, F. F. Plants under continuous light. Trends Plant Sci. 16, 310-318 (2011)). The negative effects of continuous light includes plant chlorosis, necrosis, and reductions in photosynthetic capacity, Rubisco carboxylation, quantum yield and electron transport rates (Velez-Ramirez, A. I., Van Ieperen, W., Vreugdenhil, D. & Millenaar, F. F. Plants under continuous light. Trends Plant Sci. 16, 310-318 (2011); Peter, E. et al. Mg protoporphyrin monomethylester cyclase deficiency and effects on tetrapyrrole metabolism in different light conditions. Plant Cell Physiol. 51, 1229-1241 (2010); Pulido, P. et al. Functional analysis of the pathways for 2-Cys peroxiredoxin reduction in Arabidopsis thaliana chloroplasts. J. Exp. Bot. 61, 4043-4054 (2010); Yabuta, Y. et al. Light regulation of ascorbate biosynthesis is dependent on the photosynthetic electron transport chain but independent of sugars in Arabidopsis. J. Exp. Bot. 58, 2661-2671 (2007)). Herein, we report that PNC infiltrated Arabidopsis plants were better at tolerating continuous excess light (1300 µmol $m^{-2}$ $s^{-1}$ PAR) than buffer infiltrated controls (FIG. 6a, b). After only 1 day from the start of the continuous excess light period, plants infiltrated with PNC had higher chlorophyll content than buffer controls ($P<0.05$) (FIG. 6a, b). We show for the first time that nanoceria improves whole plant tolerance to continuous light stress by augmenting plant ROS scavenging ability. Genetically modified Arabidopsis (Ksas, B., Becuwe, N., Chevalier, A. & Havaux, M. Plant tolerance to excess light energy and photooxidative damage relies on plastoquinone biosynthesis. Sci. Rep. 5, 10919 (2015)) and tomato (Alimohammadi, M., Lahiani, M. H. & Khodakovskaya, M. V. Genetic reduction of inositol triphosphate (InsP3) increases tolerance of tomato plants to oxidative stress. Planta 123-135 (2015)) plants have been recently shown to have increased tolerance to continuous light stress than wild type plants and significantly higher tolerance to photo-oxidative stress under excess light. Although genetic modification can improve plant tolerance to light stress, plant nanobionics offers the potential advantage of enhancing plant photoprotection in non-model plant systems with a simple method of infiltration via the leaf lamina.

Conclusions

Manipulation of plant photoprotection has been proposed as a mean to improve both light stress resistance and photosynthetic productivity (Murchie, E. H. & Niyogi, K. K. Manipulation of photoprotection to improve plant photosynthesis. Plant Physiol. 155, 86-92 (2011)). Herein, a plant nanobionic approach showed that negatively charged nanoceria are potent ROS scavengers in leaf mesophyll cells, protecting the photosynthetic machinery from excess light, UV light, and continuous excess light. PNC ameliorates plant light energy absorption by shielding vulnerable components of the chloroplast thylakoid membranes such as PSII from damaging ROS. PNC also improves the carbon reactions of photosynthesis by allowing higher Rubisco carboxylation rates. As a result, augmented PNC-Plants are able to grow under excess continuous light with higher chlorophyll contents than controls. A plant nanobionic approach for augmenting the plant's capability to tolerate light stress may enable higher yields in field crops sensitive to photoinhibition (Burgess, A. J. et al. High-resolution three-dimensional structural data quantify the impact of photoinhibition on long-term carbon gain in wheat canopies in the field. *Plant Physiol.* 169, 1192-1204 (2015); Tjus, S. E., Møller, B. L. & Scheller, H. V. Photosystem I is an early target of photoinhibition in barley illuminated at chilling temperatures. *Plant Physiol.* 116, 755-764 (1998)) and boost indoor farming with crops that grow under continuous light ((Velez-Ramirez, A. I., Van Ieperen, W., Vreugdenhil, D. & Millenaar, F. F. Plants under continuous light. *Trends Plant Sci.* 16, 310-318 (2011)).

Methods

Plant Material

Four weeks old *Arabidopsis thaliana* (Columbia 0) plants were used in this study. Seeds were sown in 2×2 inch pots filled with standard potting mix (Sunshine, LC1 mix). Only one individual was kept in each pot. Plants were grown in a growth chamber (Adaptis 1000, Conviron) with 200 µmol $m^{-2}$ $s^{-1}$ photosynthetic active radiation (PAR), 24±1° C., 60% humidity, and 14/10 h day/night regime. Plants were hand-watered with tap water once every two days.

Synthesis and Characterization of PNC and ANC

The poly (acrylic acid) nanoceria (PNC) were synthesized using the methodology described previously (Asati, A., et al. *ACS Nano* 4, 5321-31 (2010)). Briefly, 1.0 M cerium (III) nitrate (2.17 g, Sigma Aldrich, 99%) in molecular biology grade water (5.0 mL, Corning, Mediatech, Inc.) was mixed with an aqueous solution (10 mL) of 0.5 M poly (acrylic acid) (1,800 MW, 9 g, Sigma Aldrich). Then the solution was mixed thoroughly at 2000 rpm for 15 min using a vortex mixer (model no 945415, Fisher). The resulting mixture was then added dropwise to an ammonium hydroxide solution (30.0 mL, 30%, Sigma Aldrich) under continuous stirring at 500 rpm (RCT basic, IKA) at room temperature. After 24 hr, the solution was transferred to a 50 mL falcon tube and centrifuged at 4,000 rpm for 1 hr to remove any debris and large agglomerates. Then, 45 mL of supernatant solution was diluted in a total 90 mL with molecular biology grade water and purified from free polymers and other reagents by centrifugation at 3,500 rpm (Allegra X30, Beckman) in five cycles (10 min each cycle) using a 30K Amicon cell (MWCO 30K, Millipore Inc.). The suspension was reduced in each cycle to about 10% of the initial volume. The absorbance of eluent in each cycle was measured with an UV-VIS spectrophotometer (UV-2600, Shimadzu) to ensure no free polymers and other reagents in the final PNC solution. After purification, the nanoparticle suspension was filtered with a 20 nm pore size syringe filter (Whatman, Anotop™ 25). The absorbance of final PNC solution was then measured with the UV-VIS spectrophotometer (UV-2600, Shimadzu) and its concentration was calculated by using Beer-Lambert's law with absorbance at 271 nm, absorption molar coefficient of 3 $cm^{-1}$ $mM^{-1,2}$ and pathway length of 1 cm. The final PNC solution was stored in a fridge (4° C.) until further use.

Synthesis of amino nanoceria (ANC) was also based on the methods by Asati et al (Asati, A., et al. *ACS Nano* 4, 5321-31 (2010)) with modifications. Briefly, 3.5 mL of 5 mM PNC was mixed with 1.5 mL molecular biology grade water at 500 rpm for 2 min at room temperature. Then, 80 mM 1-ethyl-3-(3-dimethylaminopropyl) carbodiimide (EDC, Sigma Aldrich) solution (76.7 mg) in 0.5 mL MES buffer (100 mM, pH 6.0) was added dropwise into the mixture during continuous stirring at 500 rpm for 4 min. Then 80 mM N-hydroxysuccinamide (NHS, Sigma Aldrich) solution in 0.5 mL MES buffer (100 mM, pH 6.0) was added dropwise into the mixture under continuous stirring at 500 rpm. After 5 min incubation, 400 mM (0.14 mL) Ethylenediamine (EDA, 99%, Sigma Aldrich) in 0.5 mL molecular biology grade water (pH 6.8 adjusted with HCl) was added dropwise to the final reaction mixture under continuous stirring at 500 rpm for an additional 3 hr at room temperature. The resulting solution was transferred to a 15 mL falcon tube and centrifuged at 4,500 rpm for 15 min to remove any debris and large agglomerates. The supernatant solution was purified from excess EDA and other reagents by centrifugation at 4,500 rpm (Allegra X30, Beckman) in five cycles (15 min each cycle) using a 10K Amicon cell (MWCO 10K, Millipore Inc.). The resulting ANC solution was filtered by first passing it through a 100 nm pore size filter (Whatman, Anotop™ 25). Then the collected solution was filtered with a 20 nm pore size filter (Whatman, Anotop™ 25). The absorbance of final ANC solution was measured by spectrophotometry (UV-2600, Shimadzu) and its concentration was calculated as explained above with absorbance at 260 nm. The final ANC solution was stored in fridge (4° C.) until further use.

The PNC and ANC zeta potential and size were measured by a Malvern Zetasizer (Nano ZS) and Sizer (Nano S), respectively. Characterization by Fourier transformed infrared spectroscopy (FTIR) was performed with Nicolet 6700 FTIR (Thermo Electron Corp.).

PNC and ANC Labeling with DiI Fluorescent Dye

The PNC and ANC were labelled with 1,1'-Dioctadecyl-3,3,3',3'-Tetramethylindocarbocyanine Perchlorate (DiI) fluorescent dye following methods previously published (Asati, A., et al. *ACS Nano* 4, 5321-31 (2010)). Briefly, 0.4 mL of 5 mM PNC or equal molarity of ANC solution was mixed with molecular biology grade water into a final 4 mL volume. Then, 200 µL DiI dye solution (24 µL of DiI, 2.5 mg/mL, in 176 µL of DMSO (dimethyl sulfoxide)) was added dropwise under continuous stirring (1,000 rpm) at room temperature. The incubation time for PNC with DiI was 1 min and for ANC 60 min. The resulting mixture was purified from DMSO and any free DiI by centrifugation at 3,000 rpm (Allegra X30, Beckman) in five cycles (5 min each) using a 30K Amicon cell (MWCO 30K, Millipore Inc.). The absorbance of final DiI-PNC and DiI-ANC solution was measured by spectrophotometry (UV-2600, Shimadzu) and its concentration was calculated as explained above. The final DiI-PNC and DiI-ANC solutions were stored in fridge (4° C.).

Nanoceria Leaf Infiltration Protocol

A nanoparticle solution (90 µL of 5 mM PNC or ANC, 9004, of 0.45 mM DiI-PNC or DiI-ANC) was added to 10 mM TES (Sigma) infiltration buffer (10 mM TES, 10 mM $MgCl_2$, pH 7.5) to make a final 1 ml solution and vortexed. A solution of 10 mM TES infiltration buffer was used as control. The infiltration solution was then transferred to a 1 mL sterile needleless syringe (NORM-JECT®) (tapped to remove air bubbles). Leaves were slowly infiltrated with approximately 200 µL of solution by gently pressing the tip of the syringe against the bottom of the leaf lamina. The excess solution that remained on the surface of leaf lamina was gently wiped out using Kimwipes (Kimtech Science®). The infiltrated leaves were then labelled by wrapping a small thread around the petiole. The infiltrated plants were kept on the bench or fridge (4° C. and 14° C. treatments) for leaf adaptation and incubation with nanoceria for 3 hr.

Imaging Nanoceria in Leaf Tissues by Confocal Microscopy

*Arabidopsis* leaves of similar size and chlorophyll content (CCI meter, Apogee) were chosen for infiltration with either TES infiltration buffer, DiI-PNC, or DiI-ANC. After 3 hr, leaf discs were taken with a cork borer and mounted on microscopy slides as follows. A well for mounting the leaf discs on the slide (Corning 2948-75X25) was made by rolling a pea-size amount of observation gel (Carolina) to about 1 mm thin. A circular section of gel roughly twice the size of the leaf discs was cut in the center of the observation gel. The well was filled completely with perfluorodecalin (PFD, Sigma) using a Pasteur pipet. The leaf disc was placed in the PFD filled well with the infiltrated side facing up. A coverslip (VWR, cat. no.: 48366 045) was placed on top of the leaf disc to seal it into the well ensuring that no air bubbles remain trapped under. The prepared sample slide was placed on the microscopy and imaged by a Leica Laser Scanning Confocal Microscope TCS SP5 (Leica Microsystems, Germany). The imaging settings were: 40× wet objective (Leica Microsystems, Germany); 514 nm laser excitation; Z-Stack section thickness: 2 nm; Line average: 4; PMT1: 550-615 nm; PMT2: 700-800 nm. Three to eight individuals were used (4 leaf discs for each plant). Z-stacks ("xyz") of two different regions were taken per leaf disc.

Colocalization analysis was performed in LAS (Leica Application Suit) AF Lite software. Six line sections were drawn across the so-called "region of interest" (ROI) with the 30 μm interval on the DiI dye images. The corresponded distribution profiles of fluorescence intensity of DiI dye and chlorophyll for each ROI lines were plotted in Excel. The colocalization percentage of nanoceria in chloroplast was counted as the overlapped peaks of fluorescence emission of chloroplasts pigments and DiI labeled nanoceria.

Effect of Plasma Membrane Potential Depolarization on Nanoceria Transport in Leaf Tissues A solution of NaCl (100 mM, Fisher Chemical) was used to depolarize the plasma membrane potential (Shabala, S., et al. *FEBS Lett.* 581, 1993-1999 (2007); Cuin, T. A., et al. *J. Exp. Bot.* 59, 2697-2706 (2008); Jayakannan, M., et al. *J. Exp. Bot.* 64, 2255-2268 (2013); Bose, J. et al. *Ann. Bot.* 115, 481-494 (2015)). Leaves from four weeks old *Arabidopsis* plants were infiltrated with either NaCl+DiI-PNC or NaCl+DiI-ANC. An isotonic non-ion solution mannitol (170 mM, Sigma) was used as a control for possible osmotic effects. The experiments were conducted at room temperature. Confocal imaging and colocalization analysis were performed as explained above.

The Impact of Auxin and Temperature on Nanoceria Uptake

*Arabidopsis* plants were exposed to 24±1° C., 14±1° C., and 4±1° C. before and after infiltration with nanoceria. In the 24° C. treatment, plants were infiltrated separately with TES infiltration buffer (10 mM TES, 10 mM $MgCl_2$, pH 7.5), DiI-PNC (0.4 mM, in TES infiltration buffer, pH 7.5), and DiI-ANC (0.4 mM, in TES infiltration buffer, pH 7.5) at room temperature. Nanoceria was allowed to incubate for 3 hr. In the 4° C. and 14° C. treatments, plants were pre-adapted in the fridge (set to 4° C. and 14° C. respectively) for 2 hr under darkness. Then, plants were infiltrated separately with TES infiltration buffer, DiI-PNC and DiI-ANC, and kept in the fridge for another 3 h. Samples from plants kept at 4° C. and 14° C., were kept in a cooler until confocal imaging. To investigate the role of endocytosis on nanoceria uptake, we used auxin as an endocytosis inhibitor (Paciorek, T. et al. *Nature* 435, 1251-1256 (2005); Robert, S. et al. *Cell* 143, 111-121 (2010)). Plants were infiltrated with 0.4 mM DiI-PNC and 10 μM auxin (NAA, 1-naphthaleneacetic acid) under room temperature. Confocal imaging and colocalization analysis were performed as explained above.

In Vivo Monitoring of ROS Scavenging by Nanoceria

For in vivo ROS detection, leaf discs from the infiltrated plants were incubated separately with 25 μM 2',7'-dichloro-dihydrofluorescein diacetate ($H_2DCFDA$, Thermo Fisher Scientific) (in TES infiltration buffer, pH 7.5) and 10 μM dihydroethidium (DHE, Thermo Fisher Scientific) (in TES infiltration buffer, pH 7.5) dyes in 1.5 mL Eppendorf tubes for 30 min under darkness. Both of the dyes are dissolved in DMSO. $H_2DCFDA$ is converted to its fluorescence form DCF (2',7'-dichlorofluorescein) upon the cleavage of the acetate groups by ROS. DCF is regarded as an indicator of the degree of general oxidative stress. Likewise, DHE fluorescence (fluorescent product 2-hydroxyethidium) increases upon reaction with superoxide anion. Confocal imaging was performed as explained above with modifications. The confocal microscope was manually focused on a region of leaf mesophylls cells. The leaf discs were exposed to 405 nm UV laser for 3 min. The fluorescence signal from the ROS dyes was collected and recorded. Three to eight individuals (4 leaf discs for each plant) in total were used. Time-series ("xyt") measurements were taken per leaf disc. The imaging settings were: 498 nm laser excitation; PMT1: 500-600 nm; PMT2: 700-800 nm. ROS imaging with DHE and DCF was analyzed with ImageJ software (NIH). DHE and DCF fluorescence intensity was measured in Image J within the imaged region of spongy mesophyll cells. Relative increase of ROS signal intensity (AI) was calculated by the following equation:

$$\Delta I = (I_f - I_o)/I_o$$

Where Io is the initial ROS signal intensity, and If is the final ROS signal intensity at each time point.

Leaf Gas Exchange and Chlorophyll Fluorescence

*Arabidopsis* leaves that filled the entire gas analyzer chamber (2.5×1 $cm^2$) were chosen for gas exchange and chlorophyll fluorescence measurements with a GFS-3000 device (Walz). TES buffer, PNC and ANC infiltrated leaves had similar chlorophyll content index (CCI, Apogee). To conduct excess light experiments, infiltrated leaves (after 3 hr incubation period) were exposed to 2000 μmol $m^{-2}$ $s^{-1}$ PAR for 1.5 h during A-Ci curve measurement, followed by an A-light curve measurement with decreasing light levels from 2000, 1600, 1200, 900, 600, 400, 300, 200, 100, 50 to 0 μmol $m^{-2}$ $s^{-1}$ PAR. In UV-B stress experiments, infiltrated plants (after 3 hr incubation period) were exposed to a UV-B lamp (302 nm, 3 UV Series Handheld Lamps, UVP LLC) for 1.5 hr. Then A-light curve measurements were performed in the UV-B stressed plants from 2000 to 0 μmol $m^{-2}$ $s^{-1}$ PAR. A-Ci curves were analyzed using the equation developed by Sharkey et al. (2007) (Ögren, E. & Sjöström, M. Estimation of the effect of photoinhibition on the carbon gain in leaves of a willow canopy. *Planta* 181, 560-567 (1990)):

$$A = Vc_{max}[(C_c - \Gamma^*)/(C_c + K_C(1 + O/K_O))] - R_d$$

where $Vc_{max}$ is maximum rate of carboxylation, $C_c$ is the $CO_2$ partial pressure at Rubisco, $\Gamma^*$ is photorespiratory compensation point, 0 is partial pressure of oxygen, $R_d$ is mitochondrial respiration, and $K_C$ and $K_O$ are Michaelis constant of Rubisco for carbon dioxide and oxygen respectively. $Vc_{max}$ was calculated by fitting our data to the model built by Sharkey et al. (Sharkey, T. D., et al. *Plant, Cell Environ.* 30, 1035-1040 (2007)), with Ci values below 250 ppm. The $\varphi CO2$ (quantum yield of $CO_2$ assimilation) was gained by calculating the intercept of A response to the light level of 0, 50, 100, and 200 μmol $m^{-2}$ $s^{-1}$ PAR.

Monitoring Plant Chlorophyll Content Index

Plants that exhibited large, broad, and flat, leaves were chosen for measuring chlorophyll content index (CCI) with an Apogee chlorophyll content meter. Among these individuals, plants were chosen at random to be infiltrated with 450 μM PNC and TES infiltration buffer (10 mM TES, 10 mM $MgCl_2$, pH 7.5) (control). CCI was monitored in three leaves from the rosette of each individual. The plants were infiltrated with PNC solution by placing the leaf between a sterile needleless syringe (NORM-JECT®) and thumb, adjusting the pressure so as to minimize all damage to the leaf. These steps were repeated with the control group, infiltrating with TES buffer only. Plants were placed in a laboratory made growth chamber with a LED light source (CLG-150-36A, MeanWell) that provided an average 1300 µmol m$^{-2}$ s$^{-1}$ of continuous PAR. Three fans (Multifan S3 120 mm, AC Infinity) cooled down the chamber to 25° C. The individuals were placed in a square area inside the chamber right under the LED light source and the position of each individual randomized each day after measuring. The CCI of each individual was measured by taking 4 measurements per leaf, beginning at the basal end of the leaf and moving each successive measurement towards the apical end of the leaf, as close to the tip of the leaf as possible while still covering the entire measuring area of the Apogee meter with the leaf sample. The plants were under continuous light for the duration of the experiment, and only removed once each day to measure CCI. Measuring ceased after seven days.

Statistical Analysis

All data (mean±SE) were analyzed using SPSS 23.0 (SPSS Inc., Chicago, Ill., USA). Comparison between treatments was performed by independent samples t-test or one-way ANOVA based on Duncan's multiple range test. The significance levels were *P<0.05, P<0.01 and *P<0.001. Different lower case letters mean the significance at P<0.05.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of reducing reactive oxygen species in a plant that is under abiotic stress, wherein the abiotic stress comprises heat, the method comprising,
    spraying aerial portions of the plant with a cerium oxide nanoparticles coated with a polymer coating wherein said polymer coating provides a negative surface charge, wherein the contacting is under conditions such that the cerium oxide nanoparticles become co-localized with chloroplasts, mitochondria, peroxisomes, or a combination thereof in the plant and improves carbon fixation of the plant compared to a control plant not sprayed with the cerium oxide nanoparticles.

2. The method of claim 1, wherein the polymer coating comprises negatively-charged acrylic acid.

3. The method of claim 1, wherein the plant is under continuous light for at least a day before and at least a day after the spraying.

4. The method of claim 1, wherein the abiotic stress further comprises continuous light or excessive light.

5. The method of claim 1, wherein the plant is grown hydroponically.

* * * * *